(12) United States Patent
Taguchi et al.

(10) Patent No.: US 10,536,237 B2
(45) Date of Patent: Jan. 14, 2020

(54) OPTICAL TRANSCEIVER AND CONTROL METHOD

(71) Applicant: NIPPON TELEGRAPH AND TELEPHONE CORPORATION, Tokyo (JP)

(72) Inventors: Katsuhisa Taguchi, Yokosuka (JP); Kota Asaka, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/309,018

(22) PCT Filed: Jun. 19, 2017

(86) PCT No.: PCT/JP2017/022520
§ 371 (c)(1),
(2) Date: Dec. 11, 2018

(87) PCT Pub. No.: WO2017/221888
PCT Pub. Date: Dec. 28, 2017

(65) Prior Publication Data
US 2019/0123845 A1    Apr. 25, 2019

(30) Foreign Application Priority Data

Jun. 20, 2016  (JP) .................. 2016-122179

(51) Int. Cl.
*H04J 14/02* (2006.01)
*H04B 10/40* (2013.01)
(Continued)

(52) U.S. Cl.
CPC .......... *H04J 14/0223* (2013.01); *H04B 10/27* (2013.01); *H04B 10/40* (2013.01); *H04B 10/572* (2013.01); *H04B 10/272* (2013.01)

(58) Field of Classification Search
CPC .... H04B 10/272; H04B 10/40; H04B 10/572; H04B 10/27; H04B 10/08; H04B 10/02;
(Continued)

(56) References Cited

U.S. PATENT DOCUMENTS 5,319,485 A * 6/1994 Yasui .................. H04J 14/0227
                                                    398/48
6,618,401 B2 * 9/2003 Tanimoto ................ H01S 5/141
                                                    372/20
(Continued)

FOREIGN PATENT DOCUMENTS

JP     H04-334134 A    11/1992
JP     2007-195227 A    8/2007
(Continued)

OTHER PUBLICATIONS

S. Kaneko et al., "First λ-tunable dynamic load-balancing operation enhanced by 3-msec bidirectional hitless tuning on symmetric 40-Gbit/s WDM/TDM-PON" in proc. OFC'2014, San Francisco CA, Th5A.4, 2014.
(Continued)

*Primary Examiner* — Abbas H Alagheband
(74) *Attorney, Agent, or Firm* — Harness, Dickey & Pierce, P.L.C.

(57) ABSTRACT

An optical transceiver includes: a wavelength-tunable transmitter transmitting an optical transmission signal; a wavelength-tunable receiver receiving an optical reception signal; a wavelength table storing a plurality of wavelengths; an input terminal inputs a wavelength selection signal; and a control unit that identifies one of the optical transmission signal and the optical reception signal as a target based on the wavelength selection signal, selects the wavelength from the wavelength table based on the wavelength selection signal, performs transmission wavelength control in which the selected wavelength is set in the wavelength-tunable
(Continued)

transmitter as a wavelength of the optical transmission signal in the case that the optical transmission signal is identified as the target, and performs reception wavelength control in which the selected wavelength is set in the wavelength-tunable receiver as a wavelength of the optical reception signal in the case that the optical reception signal is identified as the target.

7 Claims, 20 Drawing Sheets

(51) Int. Cl.
    *H04B 10/572* (2013.01)
    *H04B 10/27* (2013.01)
    *H04B 10/272* (2013.01)
(58) Field of Classification Search
    CPC .. H04B 10/25; H04J 14/0256; H04J 14/0223; H04J 14/02
    USPC .......................................................... 398/79
    See application file for complete search history.

(56) References Cited

U.S. PATENT DOCUMENTS

| | | | | |
|---|---|---|---|---|
| 6,631,145 | B1* | 10/2003 | Tamura | H01S 5/06256 372/18 |
| 7,603,041 | B2* | 10/2009 | Varshneya | H04B 10/1123 398/170 |
| 10,135,558 | B2* | 11/2018 | Nomura | G02B 6/42 |
| 10,291,326 | B2* | 5/2019 | Glatfelter | H04B 10/2504 |
| 2008/0050115 | A1* | 2/2008 | Ikai | H04J 14/02 398/31 |
| 2008/0166127 | A1* | 7/2008 | Kazawa | H04J 14/0282 398/79 |
| 2009/0016726 | A1* | 1/2009 | Suzuki | H04B 10/0793 398/79 |
| 2010/0290785 | A1* | 11/2010 | Hinderthur | H04J 14/0227 398/79 |
| 2012/0033974 | A1* | 2/2012 | Ikai | H04J 14/02 398/79 |
| 2014/0161456 | A1* | 6/2014 | Sugawa | H04J 14/0227 398/72 |
| 2016/0204875 | A1* | 7/2016 | Araki | H04B 10/572 398/34 |

FOREIGN PATENT DOCUMENTS

| | | |
|---|---|---|
| JP | 2008-172351 A | 7/2008 |
| JP | 2014-116773 A | 6/2014 |
| WO | WO-2007/086514 A1 | 8/2007 |

OTHER PUBLICATIONS

International Search Report for PCT/JP2017/022520, ISA/JP, dated Sep. 5, 2017, with English translation attached.

* cited by examiner

FIG. 3

| NUMBER OF PULSES | TRANSMISSION/RECEPTION WAVELENGTH |
|---|---|
| 1 | $\lambda 1$ |
| 2 | $\lambda 2$ |
| 3 | $\lambda 3$ |
| 4 | $\lambda 4$ |
| 5 | $\lambda 1$ |
| 6 | $\lambda 2$ |
| 7 | $\lambda 3$ |
| 8 | $\lambda 4$ |

Rows 1–4: TRANSMISSION WAVELENGTH
Rows 5–8: RECEPTION WAVELENGTH

FIG. 5

| NUMBER OF PULSES | WAVELENGTH |
|---|---|
| 1 | $\lambda 1$ |
| 2 | $\lambda 2$ |
| 3 | $\lambda 3$ |
| 4 | $\lambda 4$ |

FIG. 6

| PULSE VOLTAGE | TRANSMISSION/RECEPTION |
|---|---|
| V1 | TRANSMISSION WAVELENGTH |
| V2 | RECEPTION WAVELENGTH |

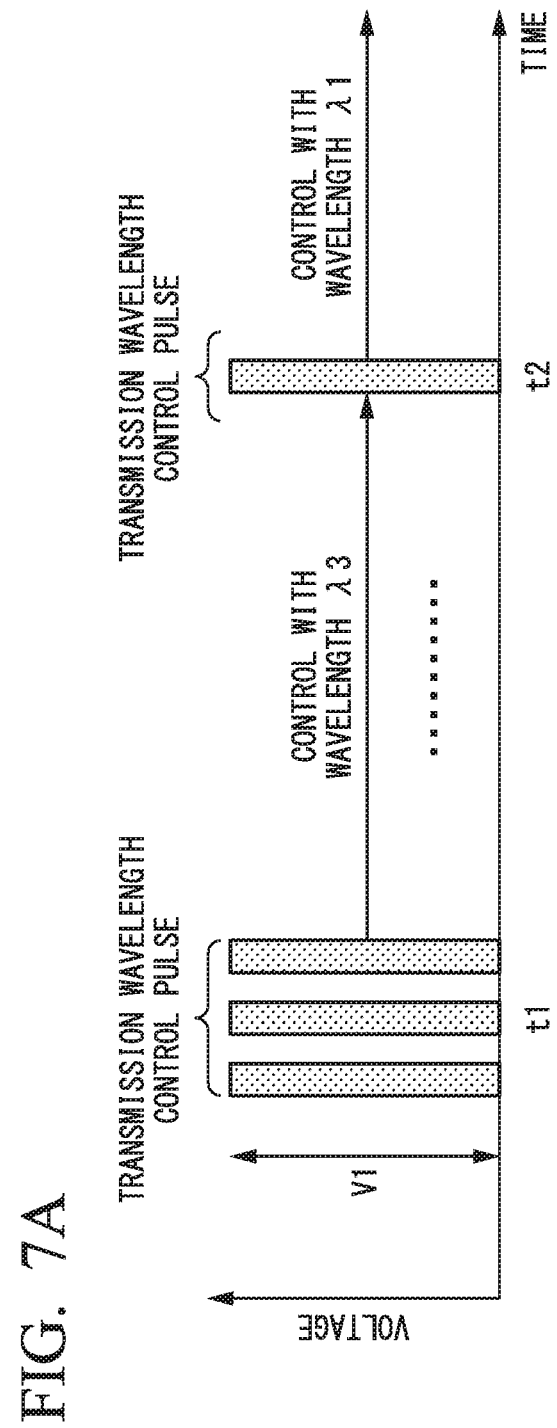

FIG. 9

| NUMBER OF PULSES | WAVELENGTH |
|---|---|
| 1 | λ1 |
| 2 | λ2 |
| 3 | λ3 |
| 4 | λ4 |

FIG. 10

| PULSE WIDTH | TRANSMISSION/RECEPTION |
|---|---|
| τ1 | TRANSMISSION WAVELENGTH |
| τ2 | RECEPTION WAVELENGTH |

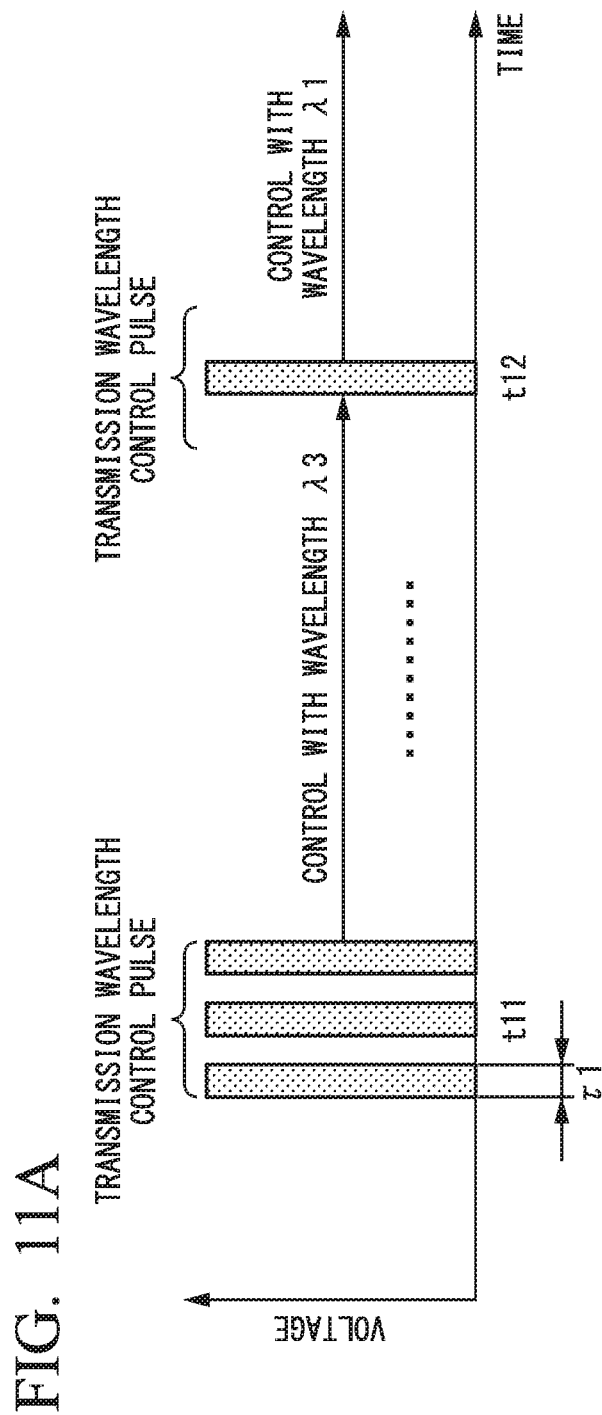

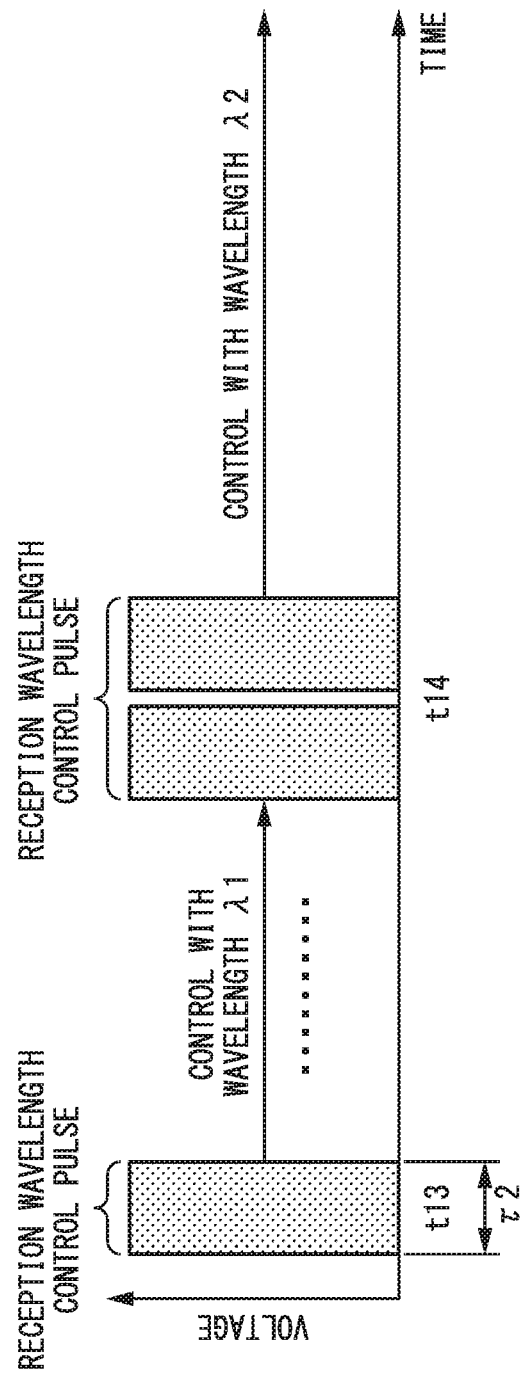

| CONTROL VOLTAGE | TRANSMISSION/RECEPTION WAVELENGTH | |
|---|---|---|
| E1 | λ1 | TRANSMISSION WAVELENGTH |
| E2 | λ2 | |
| E3 | λ3 | |
| E4 | λ4 | |
| E5 | λ1 | RECEPTION WAVELENGTH |
| E6 | λ2 | |
| E7 | λ3 | |
| E8 | λ4 | |

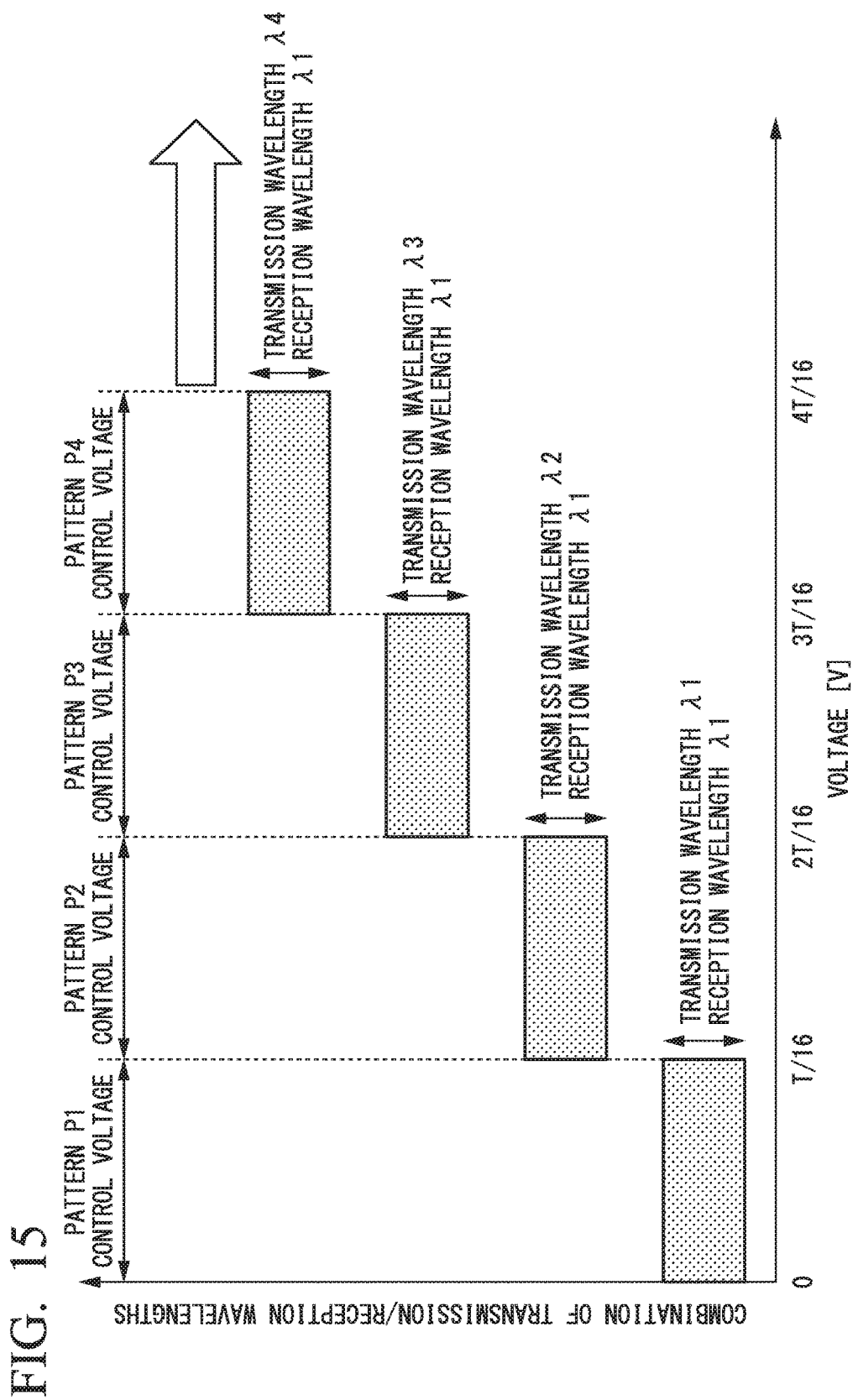

FIG. 16

| PATTERN | CONTROL VOLTAGE | TRANSMISSION WAVELENGTH | RECEPTION WAVELENGTH |
|---|---|---|---|
| P1 | 0~T/16 | $\lambda 1$ | $\lambda 1$ |
| P2 | T/16~2T/16 | $\lambda 2$ | $\lambda 1$ |
| P3 | 2T/16~3T/16 | $\lambda 3$ | $\lambda 1$ |
| P4 | 3T/16~4T/16 | $\lambda 4$ | $\lambda 1$ |
| P5 | 4T/16~5T/16 | $\lambda 1$ | $\lambda 2$ |
| P6 | 5T/16~6T/16 | $\lambda 2$ | $\lambda 2$ |
| P7 | 6T/16~7T/16 | $\lambda 3$ | $\lambda 2$ |
| P8 | 7T/16~8T/16 | $\lambda 4$ | $\lambda 2$ |
| P9 | 8T/16~9T/16 | $\lambda 1$ | $\lambda 3$ |
| P10 | 9T/16~10T/16 | $\lambda 2$ | $\lambda 3$ |
| P11 | 10T/16~11T/16 | $\lambda 3$ | $\lambda 3$ |
| P12 | 11T/16~12T/16 | $\lambda 4$ | $\lambda 3$ |
| P13 | 12T/16~13T/16 | $\lambda 1$ | $\lambda 4$ |
| P14 | 13T/16~14T/16 | $\lambda 2$ | $\lambda 4$ |
| P15 | 14T/16~15T/16 | $\lambda 3$ | $\lambda 4$ |
| P16 | 15T/16~16T/16 | $\lambda 4$ | $\lambda 4$ |

FIG. 17

| PATTERN | CONTROL VOLTAGE | TRANSMISSION WAVELENGTH | RECEPTION WAVELENGTH |
|---|---|---|---|
| P0 | 0 | $\lambda 1$ | $\lambda 1$ |
| P1 | 0~T/15 | $\lambda 2$ | $\lambda 1$ |
| P2 | T/15~2T/15 | $\lambda 3$ | $\lambda 1$ |
| P3 | 2T/15~3T/15 | $\lambda 4$ | $\lambda 1$ |
| P4 | 3T/15~4T/15 | $\lambda 1$ | $\lambda 2$ |
| P5 | 4T/15~5T/15 | $\lambda 2$ | $\lambda 2$ |
| P6 | 5T/15~6T/15 | $\lambda 3$ | $\lambda 2$ |
| P7 | 6T/15~7T/15 | $\lambda 4$ | $\lambda 2$ |
| P8 | 7T/15~8T/15 | $\lambda 1$ | $\lambda 3$ |
| P9 | 8T/15~9T/15 | $\lambda 2$ | $\lambda 3$ |
| P10 | 9T/15~10T/15 | $\lambda 3$ | $\lambda 3$ |
| P11 | 10T/15~11T/15 | $\lambda 4$ | $\lambda 3$ |
| P12 | 11T/15~12T/15 | $\lambda 1$ | $\lambda 4$ |
| P13 | 12T/15~13T/15 | $\lambda 2$ | $\lambda 4$ |
| P14 | 13T/15~14T/15 | $\lambda 3$ | $\lambda 4$ |
| P15 | 14T/15~15T/15 | $\lambda 4$ | $\lambda 4$ |

FIG. 19

| BURST CONTROL SIGNAL | CONTROL VOLTAGE VALUE | OPTICAL TRANSMISSION SIGNAL OUTPUT |
|---|---|---|
| BURST-ENABLE SIGNAL | Hi | ON |
| | Low | OFF |
| BURST-DISABLE SIGNAL | Hi | OFF |
| | Low | ON |

OPTICAL TRANSCEIVER AND CONTROL METHOD

CROSS-REFERENCE TO RELATED APPLICATIONS

This application is a 371 U.S. National Stage of International Application No. PCT/JP2017/022520, filed Jun. 19, 2017, which claims priority to Japanese Patent Application No. 2016-122179, filed Jun. 20, 2016. The disclosures of the above applications are incorporated herein by reference.

TECHNICAL HELD

The present invention relates to optical transmission and reception.

BACKGROUND ART

In recent years, introduction of a passive optical network (PON) system as an optical access system that supports a rapidly spreading Fiber to the Home (FTTH) service has progressed worldwide. In a PON system, one optical line terminal (OLT) disposed in a housing station accommodates optical network units (ONU) disposed in a plurality of subscriber homes through an optical splitter disposed in the middle of an optical fiber transmission line. The PON system is an optical access system that realizes high economic efficiency by sharing optical fiber transmission lines, an optical splitter, and OLTs among a plurality of subscribers.

At present, in Japan, a Gigabit Ethernet-PON (GE-PON) system having a transmission quantity of 1 Gb/s has been mainly commercially introduced (Ethernet is a registered trademark). In addition, as a next-generation optical access system realizing a higher speed, standardization of 10 G-EPON and XP-PON having a total transmission capacity of a 10 Gb/s level has been completed, and research and development thereof are progressing worldwide.

In light of such an increase in the transmission speed, as a next PON system at the 10 Gb/s level, NG-PON2 has been discussed on the Full Service Access Network (FSAN) forum. In the NG-PON2, in addition to an increase in speed from that of a conventional PON system, improvement of the access network is set as a goal. As the NG-PON2, a time and wavelength-division multiplexing (TWDM)-PON system has been reviewed. The TWDM-PON system is able to achieve an increase in accommodating efficiency, efficiency of maintenance management and the like by using wavelength-division multiplexing (WDM) utilizing characteristics of light in addition to time division multiplexing (TDM) that has been used in a conventional PON system.

CITATION LIST

[Non-Patent Literature]
[Non-Patent Literature 1]

S. Kaneko, T. Yoshida, S. Furusawa, M. Sarashina, H. Tamai, A. Suzuki, T. Mukojima, S. Kimura, and N. Yoshimoto, "First λ-tunable dynamic load balancing operation enhanced by 3-msec bidirectional hitless tuning on symmetric 40-Gbit/s WDM/TDM-PON" in proc. OFC' 2014, San Francisco Calif., Th5A. 4, 2014.

SUMMARY OF INVENTION

Technical Problem

Hitherto, a decrease in size and a decrease in cost have been realized using optical transceiver modules having common specifications not only in optical communication systems such as PON systems but all the way back to short reach and the like. Particularly, in data center solutions, there are strong requests for decreases in size of optical transceiver modules, and accordingly, technical advances for decreases in size have been remarkable.

Meanwhile, also in the TWDM-PON that realizes a wavelength-tunable function of the system using a wavelength-tunable transceiver, there are requests for standardization of optical transceiver modules and a decrease in size of the optical transceivers. Particularly, transceivers mounted in ONUs are installed inside customers' homes and thus are requested to have further decreases in size, and decreases in size toward a Small Form-factor Pluggable+ (SFP+) size that is a small-size specification of a 10 G module are expected.

In addition, there is a limit on transceiver control terminals included in a module, and there is a problem in that the number of idle terminals is small in SFP+. For this reason, in order to realize a decrease in size of a wavelength-tunable transceiver used for the TWDM-PON, it is necessary to decrease the number of terminals of an optical transceiver module used for transmission/reception wavelength control as much as possible.

For example, in order to allow a wavelength to be selectable from four wavelengths, generally, two-pin terminals are provided as terminals for wavelength setting, and a voltage applied to the two-pin terminals is set as one of "00," "01," "10," and "11." In the case that the number of settable wavelengths is extended to eight, three-pin terminals are necessary as terminals for wavelength setting. Furthermore, when a transmission wavelength and a reception wavelength are individually set, the number of pins to be included in terminals is four for selecting the wavelengths from four wavelengths, and the number of pins to be included in terminals is six for selecting the wavelengths from eight wavelengths.

In view of the situation described above, an object of the present invention is to provide an optical transceiver that can be used as an optical transceiver module, and a control method capable of decreasing the number of terminals used for controlling optical signals to be transmitted and received.

Solution to Problem

According to a first aspect of the present invention, an optical transceiver includes: a wavelength-tunable transmission unit configure to transmit an optical transmission signal; a wavelength-tunable reception unit configured to receive an optical reception signal; a wavelength table configured to store a plurality of wavelengths; an input terminal configured to input a wavelength selection signal; and a control unit configured to identify one of the optical transmission signal and the optical reception signal as a target on the basis of the wavelength selection signal, select the wavelength from the wavelength table on the basis of the wavelength selection signal, perform transmission wavelength control in which the selected wavelength is set in the wavelength-tunable transmission unit as a wavelength of the optical transmission signal in a case that the optical transmission signal is identified as the target, and perform reception wavelength control in which the selected wavelength is set in the wavelength-tunable reception unit as a wavelength of the optical reception signal in a case that the optical reception signal is identified as the target.

According to a second aspect of the present invention, in the optical transceiver according to the first aspect described above, the wavelength selection signal is input to the input terminal as one or more control pulses, the wavelength table stores the number of control pulses in association with each of wavelengths of the optical transmission signal and each of wavelengths of the optical reception signal, and the control unit selects a wavelength of the optical transmission signal or a wavelength of the optical reception signal corresponding to the number of the one or more control pulses as the wavelength selection signal, performs the transmission wavelength control in a case that the wavelength of the optical transmission signal is selected, and performs the reception wavelength control in a case that the wavelength of the optical reception signal is selected.

According to a third aspect of the present invention, in the optical transceiver according to the first aspect described above, the wavelength selection signal is input to the input terminal as one or more control pulses, the wavelength table stores the number of control pulses in association with each of the plurality of wavelengths, and the control unit identifies one of the optical transmission signal and the optical reception signal as a target on the basis of a voltage value or a pulse width of the one or more control pulses as the wavelength selection signal, selects a wavelength corresponding to the number of the one or more control pulses as the wavelength selection signal from the wavelength table, performs the transmission wavelength control in a case that the optical transmission signal is identified as the target, and performs the reception wavelength control in a case that the optical reception signal is identified as the target.

According to a fourth aspect of the present invention, in the optical transceiver according to the first aspect described above, the wavelength selection signal is input to the input terminal as a control voltage having one voltage value among a plurality of voltage values set in advance, the wavelength table stores a voltage value of the control voltage in association with each of wavelengths of the optical transmission signal and each of wavelengths of the optical reception signal, and the control unit selects a wavelength of the optical transmission signal or a wavelength of the optical reception signal corresponding to the voltage value of the control voltage as the wavelength selection signal, performs the transmission wavelength control in a case that the wavelength of the optical transmission signal is selected, and performs the reception wavelength control in a case that the wavelength of the optical reception signal is selected.

According to a fifth aspect of the present invention, in the optical transceiver according to the second or third aspect described above, a transmission control signal set by voltage values corresponding to transmission or stoppage of the optical transmission signal is input to the input terminal, and the control unit controls transmission of the optical transmission signal using the wavelength-tunable transmission unit in accordance with the transmission control signal.

According to a sixth aspect of the present invention, a control method is a control method in an optical transceiver including a wavelength-tunable transmission unit transmitting an optical transmission signal, a wavelength-tunable reception unit receiving an optical reception signal, a wavelength table storing a plurality of wavelengths, and an input terminal to which a wavelength selection signal is input. The control method includes: a step of identifying one of the optical transmission signal and the optical reception signal as a target on the basis of the wavelength selection signal; a step of selecting a wavelength from the wavelength table on the basis of the wavelength selection signal; and a step of performing transmission wavelength control in which the selected wavelength is set in the wavelength-tunable transmission unit as a wavelength of the optical transmission signal in a case that the optical transmission signal is identified as the target and performing reception wavelength control in which the selected wavelength is set in the wavelength-tunable reception unit as a wavelength of the optical reception signal in a case that the optical reception signal is identified as the target.

Advantageous Effects of Invention

According to the present invention, it is possible to decrease the number of terminals used for controlling optical signals that are transmitted and received.

BRIEF DESCRIPTION OF DRAWINGS

FIG. 3 is a diagram illustrating a relationship between the number of pulses of a pulse signal used as a wavelength selection signal and transmission/reception wavelengths according to the second embodiment.

FIG. 5 is a diagram illustrating a relationship between the number of pulses and a wavelength according to the third embodiment.

FIG. 6 is a diagram illustrating a relationship between a pulse voltage and transmission/reception according to the third embodiment.

FIG. 7A is a waveform diagram illustrating a relationship between a wavelength selection signal and wavelength setting of an optical transmission signal in an optical transceiver module according to the third embodiment.

FIG. 9 is a diagram illustrating a relationship between the number of pulses and a wavelength according to the fourth embodiment.

FIG. 10 is a diagram illustrating a relationship between a pulse width and transmission/reception according to the fourth embodiment.

FIG. 11A is a waveform diagram illustrating a relationship between a wavelength selection signal and wavelength setting of an optical transmission signal in an optical transceiver module according to the fourth embodiment.

FIG. 11B is a waveform diagram illustrating a relationship between a wavelength selection signal and wavelength setting of an optical reception signal in an optical transceiver module according to the fourth embodiment.

FIG. 15 is a diagram illustrating a relationship between a control voltage and a combination pattern of transmission/reception wavelengths according to the sixth embodiment.

FIG. 16 is a diagram illustrating a relationship between a control voltage and a combination pattern of transmission/reception wavelengths according to the sixth embodiment.

FIG. 17 is a diagram illustrating a modified example of the relationship between a control voltage and a combination pattern of transmission/reception wavelengths according to the sixth embodiment.

FIG. 19 is a diagram illustrating a burst control signal according to the seventh embodiment.

DESCRIPTION OF EMBODIMENTS

First Embodiment

Figure 1:
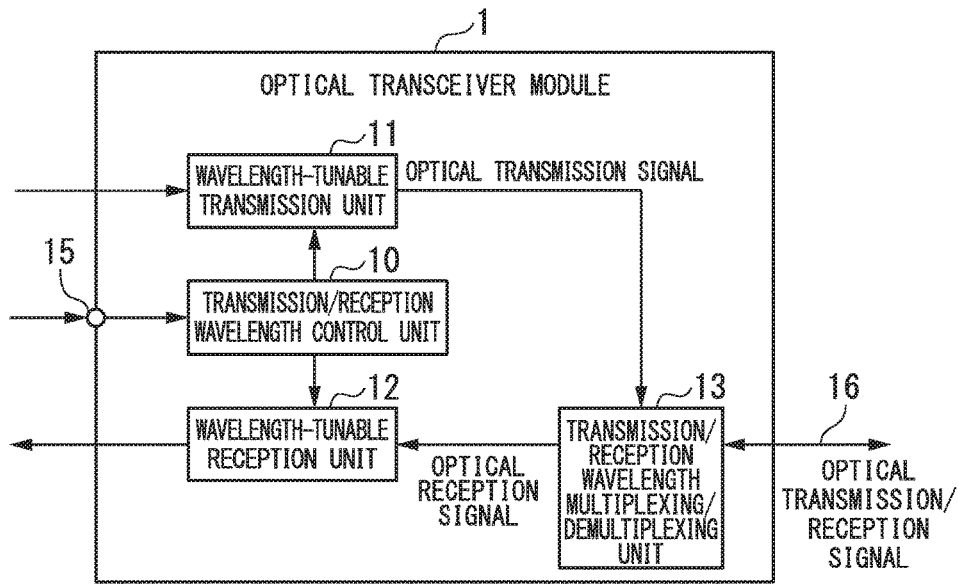
FIG. 1 is a block diagram of an optical transceiver module according to a first embodiment.

FIG. 1 is a block diagram of an optical transceiver module 1 according to a first embodiment. As illustrated in FIG. 1, the optical transceiver module 1 includes a transmission/reception wavelength control unit 10, a wavelength-tunable transmission unit 11, a wavelength-tunable reception unit 12, a transmission/reception wavelength multiplexing/demultiplexing unit 13 and an input terminal 15. The input terminal 15 is connected to the transmission/reception wavelength control unit 10.

A wavelength selection signal is supplied to the input terminal 5. The transmission/reception wavelength control unit 10 identifies the setting of a transmission wavelength and the setting of a reception wavelength on the basis of the wavelength selection signal supplied from the input terminal 15 and controls a wavelength of an optical transmission signal (transmission wavelength) transmitted from the wavelength-tunable transmission unit 11 and a wavelength of an optical reception signal (reception wavelength) received by the wavelength-tunable reception unit 12.

The wavelength-tunable transmission unit 11 converts an electric signal to be transmitted into an optical transmission signal and outputs the converted optical transmission signal to an optical fiber 16 through the transmission/reception wavelength multiplexing/demultiplexing unit 13. The wavelength-tunable transmission unit 11 can set a wavelength of an optical transmission signal transmitted to the optical fiber 16 to have an arbitrary value under the control of the transmission/reception wavelength control unit 10.

The wavelength-tunable reception unit 12 converts an optical reception signal received from the optical fiber 16 through the transmission/reception wavelength multiplexing/demultiplexing unit 13 into an electric signal and outputs the converted electric signal. The wavelength-tunable reception unit 12 can set a wavelength of an optical reception signal received from the optical fiber 16 to have an arbitrary value under the control of the transmission/reception wavelength control unit 10.

The transmission/reception wavelength multiplexing/demultiplexing unit 13 multiplexes optical transmission signals output from the wavelength-tunable transmission unit 11 and transmits a resultant signal to another device through the optical fiber 16. In addition, the transmission/reception wavelength multiplexing/demultiplexing unit 13 outputs an optical reception signal transmitted via the optical fiber 16 through wavelength-division multiplexing to the wavelength-tunable reception unit 12.

In this way, in the optical transceiver module 1 according to the first embodiment, the transmission/reception wavelength control unit 10 identifies setting of a transmission wavelength and setting of a reception wavelength on the basis of a wavelength selection signal supplied from the input terminal 15 and controls a transmission wavelength of an optical transmission signal to be transmitted from the wavelength-tunable transmission unit 11 and a reception wavelength of an optical reception signal to be received by the wavelength-tunable reception unit 12. The input terminal 15 is a common terminal for wavelength control of a transmission wavelength and a reception wavelength. The optical transceiver module 1 can freely set the transmission wavelength and the reception wavelength in combination with each other in accordance with a wavelength selection signal input to one pin included in the input terminal 15. A wavelength selected from among a plurality of wavelengths can be set in the transmission wavelength and the reception wavelength without increasing the number of pins included in the input terminal 15, and accordingly, the shape of the optical transceiver module 1 can be easily decreased in size.

Second Embodiment

Figure 2:
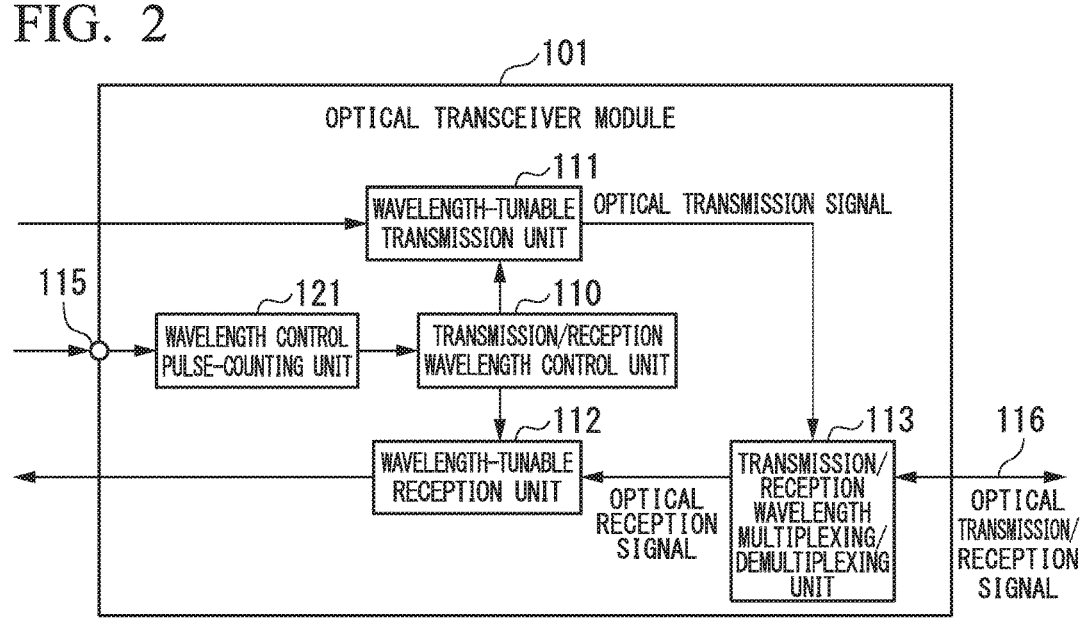
FIG. 2 is a block diagram illustrating the configuration of an optical transceiver module according to a second embodiment.

FIG. 2 is a block diagram illustrating the configuration of an optical transceiver module 101 according to a second embodiment. As illustrated in FIG. 2, the optical transceiver module 101 includes a transmission/reception wavelength control unit 110, a wavelength-tunable transmission unit 111, a wavelength-tunable reception unit 112, a transmission/reception wavelength multiplexing/demultiplexing unit 113, an input terminal 115 and a wavelength control pulse-counting unit 121. The wavelength-tunable transmission unit 111, the wavelength-tunable reception unit 112 and the transmission/reception wavelength multiplexing/demultiplexing unit 113 are respectively similar to the wavelength-tunable transmission unit 11, the wavelength-tunable reception unit 12, and the transmission/reception wavelength multiplexing/demultiplexing unit 13 illustrated in FIG. 1. In addition, an optical fiber 116 is similar to the optical fiber 16 illustrated in FIG. 1.

A pulse signal is supplied from the input terminal 115 to the wavelength control pulse-counting unit 121 as a wavelength selection signal. In the pulse signal used as a wavelength selection signal, the range of the numbers of pulses is divided for the control of a transmission wavelength and the control of a reception wavelength.

FIG. 3 is a diagram illustrating a relationship between the number of pulses of a pulse signal used as a wavelength selection signal and transmission/reception wavelengths. As illustrated in FIG. 3, the number of pulses "1" to "4" are used for the setting of the transmission wavelength. The number of pulses "1" corresponds to a transmission wavelength λ1, the number of pulses "2" corresponds to a transmission wavelength λ2, the number of pulses "3" corresponds to a transmission wavelength λ3, and the number of pulses "4" corresponds to a transmission wavelength λ4. In addition, the numbers of pulses "5" to "8" are used for the setting of the reception wavelength. The number of pulses "5" corresponds to a reception wavelength λ1, the number of pulses "6" corresponds to a reception wavelength λ2, the number of pulses "7" corresponds to a reception wavelength λ3, and the number of pulses "8" corresponds to a reception wavelength λ4. In this example, the numbers of pulses "5" to "8" become the numbers of pulses "1" to "4" when the number of pulses "4" is subtracted therefrom, and there is a correspondence between the number of pulses and the wavelength. In other words, a wavelength table in which the numbers of pulses are associated with a plurality of transmission wavelengths and a plurality of reception wavelengths is set in advance. Different numbers of pulses are associated with transmission wavelengths and reception wavelengths such that the transmission wavelength and the reception wavelength can be uniquely selected. The optical transceiver module 101 may include the wavelength table illustrated in FIG. 3. Alternatively, the transmission/reception wavelength control unit 110 may include the wavelength table illustrated in FIG. 3.

When a wavelength selection signal is input to the input terminal 115, the number of pulses of the wavelength selection signal is counted by the wavelength control pulse-counting unit 121. The transmission/reception wavelength control unit 110 identifies one of the transmission wavelength and the reception wavelength as a target for setting on the basis of the number of pulses of the wavelength selection signal and determines a wavelength to be set.

For example, in the case that the number of pulses of the wavelength selection signal supplied from the input terminal 115 is "1," the number of pulses is within the range of "1" to "4," and accordingly, the transmission/reception wavelength control unit 110 determines that the setting of the transmission wavelength is performed. The transmission/reception wavelength control unit 110 determines that the wavelength to be set is λ1 on the basis of a correspondence relationship of the wavelength table illustrated in FIG. 3. In accordance with the result of the determination, the transmission/reception wavelength control unit 110 sets the transmission wavelength of the wavelength-tunable transmission unit 111 as λ1.

On the other hand, in the case that the number of pulses of the wavelength selection signal supplied from the input terminal 115 is "5," the number of pulses is within the range of "5" to "8," and accordingly, the transmission/reception wavelength control unit 110 determines that the setting of the reception wavelength is performed. The transmission/reception wavelength control unit 110 determines that the wavelength to be set is λ1 on the basis of the correspondence relationship of the wavelength table illustrated in FIG. 3. In accordance with this, the transmission/reception wavelength control unit 110 sets the reception wavelength of the wavelength-tunable reception unit 112 as λ1.

As described above, a pulse signal is supplied to the input terminal 115 of the optical transceiver module 101 according to the second embodiment as a wavelength selection signal of transmission and reception. Then, the number of pulses of this pulse signal is divided into the range of transmission wavelength control and the range of reception wavelength control, and the number of pulses and the wavelength are associated with each other. The input terminal 115 is a common terminal for wavelength control for the transmission wavelength and the reception wavelength. The optical transceiver module 101 can freely set the transmission wavelength and the reception wavelength at different wavelengths in accordance with a wavelength selection signal input to one pin included in the input terminal 115. An operation of counting the number of pulses for selecting a wavelength is easy to control in digital control, and accordingly, the optical transceiver module 101 can be easily designed and implemented.

Third Embodiment

Figure 4:
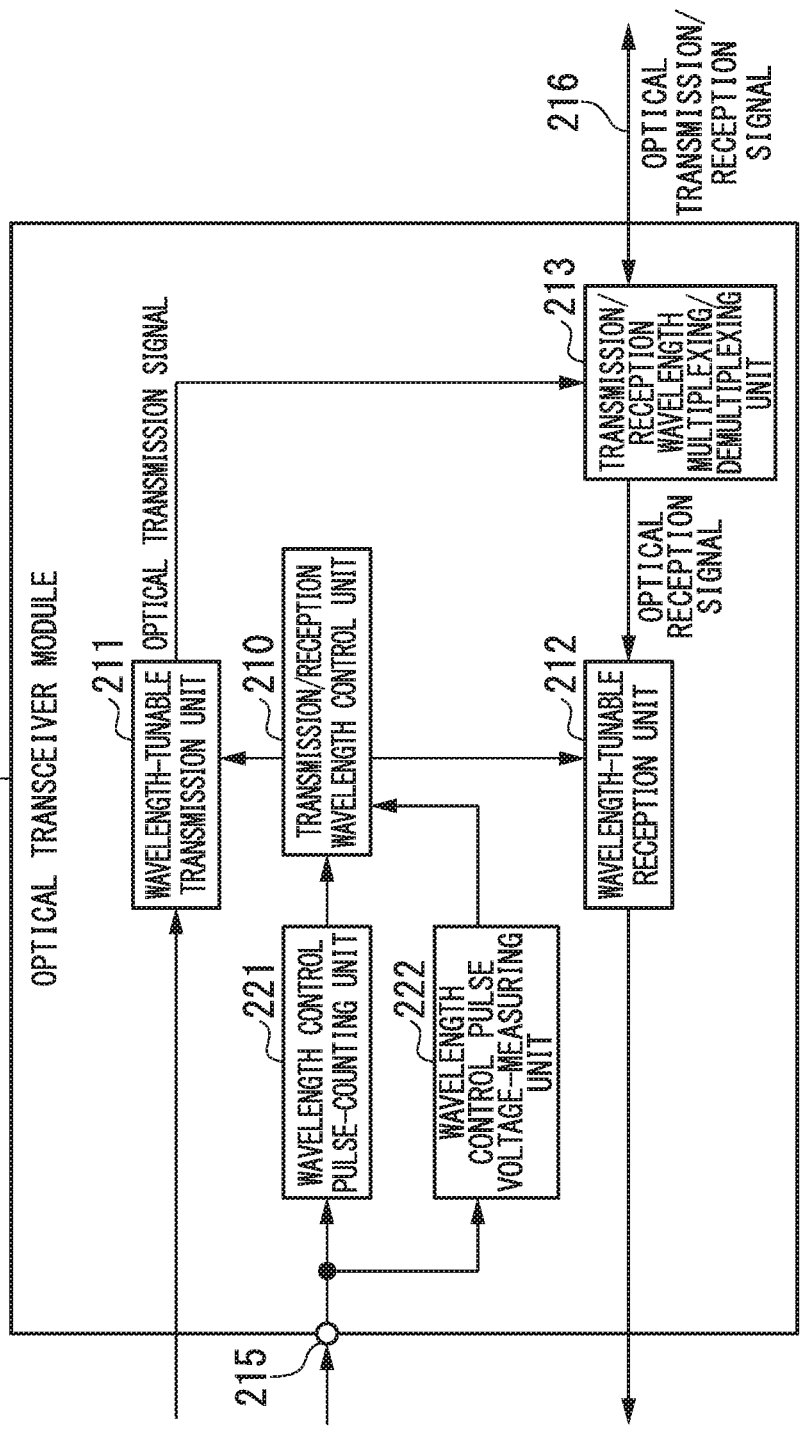
FIG. 4 is a block diagram illustrating the configuration of an optical transceiver module according to a third embodiment.

FIG. 4 is a block diagram illustrating the configuration of an optical transceiver module 201 according to a third embodiment. As illustrated in FIG. 4, the optical transceiver module 201 includes a transmission/reception wavelength control unit 210, a wavelength-tunable transmission unit 211, a wavelength-tunable reception unit 212, a transmission/reception wavelength multiplexing/demultiplexing unit 213, an input terminal 215, a wavelength control pulse-counting unit 221 and a wavelength control pulse voltage-measuring unit 222. The wavelength-tunable transmission unit 211, the wavelength-tunable reception unit 212 and the transmission/reception wavelength multiplexing/demultiplexing unit 213 are respectively similar to the wavelength-tunable transmission unit 11, the wavelength-tunable reception unit 12 and the transmission/reception wavelength multiplexing/demultiplexing unit 13 illustrated in FIG. 1. In addition, an optical fiber 216 is similar to the optical fiber 16 illustrated in FIG. 1.

In the optical transceiver module 201 according to the third embodiment, a pulse signal is supplied to the input terminal 215 as a wavelength selection signal for transmission/reception, the pulse signal has the number of pulses corresponding to a wavelength and has one of two voltage values used for identifying one of a transmission wavelength and a reception wavelength as the setting target. FIG. 5 illustrates a wavelength table storing a relationship between the number of pulses and a wavelength. As illustrated in the wavelength table illustrated in FIG. 5, the number of pulses "1" corresponds to a wavelength λ1, the number of pulses "2" corresponds to a wavelength λ2, the number of pulses "3" corresponds to a wavelength λ3, and the number of pulses "4" corresponds to a wavelength λ4. In other words, the wavelength table in which the number of pulses is associated with each of a plurality of wavelengths is set in advance. FIG. 6 is a diagram illustrating an identification table storing a relationship between a pulse voltage and transmission/reception. As illustrated in the identification table illustrated in FIG. 6, a voltage V1 corresponds to the transmission wavelength, and a voltage V2 corresponds to the reception wavelength. The wavelength control pulse-counting unit 221 counts the number of pulses of the wavelength selection signal supplied from the input terminal 215. The wavelength control pulse voltage-measuring unit 222 measures a pulse voltage of the wavelength selection signal supplied from the input terminal 215. The optical transceiver module 201 may include the wavelength table illustrated in FIG. 5 and the identification table illustrated in FIG. 6. Alternatively, the transmission/reception wavelength control unit 210 may include the wavelength table illustrated in FIG. 5 and the identification table illustrated in FIG. 6.

For example, in the case that the number of pulses of the wavelength selection signal supplied from the input terminal 215 is "1" and the pulse voltage is V1, the transmission/reception wavelength control unit 210 sets the transmission wavelength of the wavelength-tunable transmission unit 211 as λ1 on the basis of the correspondence relationships represented in the tables illustrated in FIGS. 5 and 6. On the other hand, in the case that the number of pulses of the wavelength selection signal supplied from the input terminal 215 is "3" and the pulse voltage is V2, the transmission/reception wavelength control unit 210 sets the reception wavelength of the wavelength-tunable reception unit 212 as λ3 on the basis of the correspondence relationships represented in the tables illustrated in FIGS. 5 and 6.

Figure 7B:
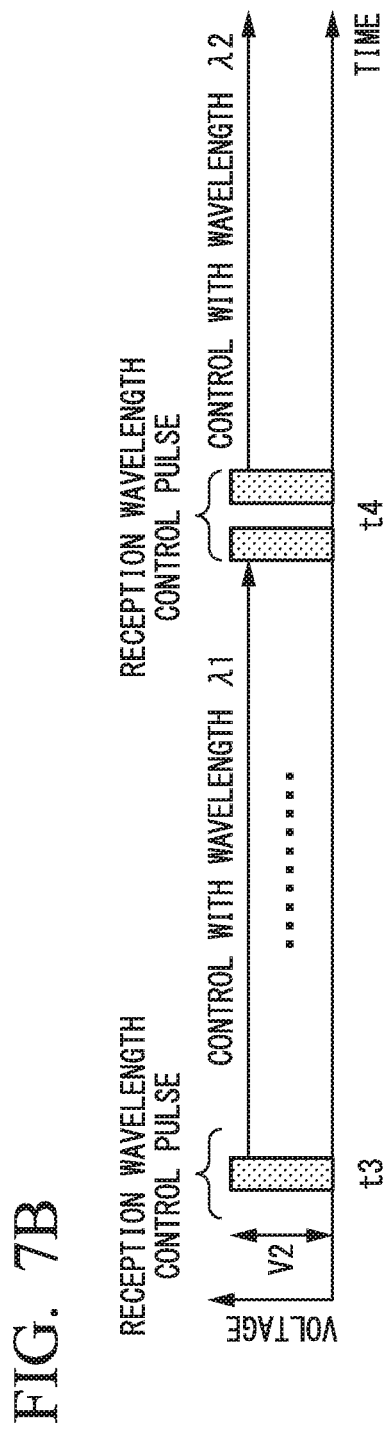
FIG. 7B is a waveform diagram illustrating a relationship between a wavelength selection signal and wavelength setting of an optical reception signal in an optical transceiver module according to the third embodiment.

FIGS. 7A and 7B are waveform diagrams illustrating relationships between a wavelength selection signal and wavelength setting of transmission/reception in the optical transceiver module 201 according to the third embodiment. In FIGS. 7A and 7B, the horizontal axis represents the time, and the vertical axis represents the voltage of the wavelength selection signal input from the input terminal 215.

As illustrated in FIG. 7A, at a time t1, the pulses having the voltage V1 as the wavelength selection signal supplied from the input terminal 215 are assumed to be counted as the number of pulses "3." In this case, the wavelength control pulse voltage-measuring unit 222 outputs the detected voltage V1 to the transmission/reception wavelength control unit 210. The wavelength control pulse-counting unit 221 outputs the number of pulses "3" to the transmission/reception wavelength control unit 210. Since the voltage of the pulse is V1, the transmission/reception wavelength control unit 210 controls the transmission wavelength on the basis of the relationship represented in the identification table illustrated in FIG. 6. Since the number of pulses is "3," the transmission/reception wavelength control unit 210 selects the wavelength λ3 on the basis of the relationship represented in the wavelength table illustrated in FIG. 5. Accordingly, the transmission/reception wavelength control unit 210 sets the transmission wavelength of the wavelength-tunable transmission unit 211 as λ3.

In FIG. 7A, at a time t2, the pulses having the voltage V1 are assumed to be detected from the input terminal 215 of the wavelength selection signal as having the number of pulses of "1." In this case, since the voltage of the pulse is V1, and the number of pulses is "1," the transmission/reception wavelength control unit 210 sets the transmission wavelength of the wavelength-tunable transmission unit 211 as λ1 on the basis of the relationships represented in the tables illustrated in FIGS. 5 and 6.

In FIG. 7B, at a time t3, pulses of the voltage V2 are assumed to be detected from the input terminal 215 of the wavelength selection signal as having the number of pulses of "1." In this case, the transmission/reception wavelength control unit 110 sets the reception wavelength of the wavelength-tunable reception unit 212 as λ1 on the basis of the relationships represented in the tables illustrated in FIGS. 5 and 6.

In FIG. 7B, at a time t4, pulses having the voltage V2 are assumed to be detected from the input terminal 215 of the wavelength selection signal as having the number of pulses of "2." In this case, since the voltage of the pulses is V2, and the number of pulses is "2," the transmission/reception wavelength control unit 210 sets the reception wavelength of the wavelength-tunable reception unit 212 as λ2 on the basis of the relationships represented in the tables illustrated in FIGS. 5 and 6.

As described above, in the optical transceiver module 201 according to the third embodiment, a pulse signal that has the number of pulses according to the wavelength and has a voltage value used for identifying a setting target is input to the input terminal 215 as a wavelength selection signal. Then, the number of pulses of the input pulse signal is counted by the wavelength control pulse-counting unit 221, and the voltage of the pulse signal is detected by the wavelength control pulse voltage-measuring unit 222. The input terminal 215 is a common terminal of wavelength control for the transmission wavelength and the reception wavelength. The optical transceiver module 201 can freely set the transmission wavelength and the reception wavelength at different wavelengths in accordance with a wavelength selection signal input to one pin included in the input terminal 215. The optical transceiver module 201 identifies one of the transmission wavelength and the reception wavelength as a setting target using a voltage value of the control pulse, and accordingly, as compared with the case that a setting target is identified using the number of pulses, a time that is necessary for inputting a wavelength selection signal can be shortened. In other words, the optical transceiver module 201 can shorten a time required for controlling a transmission wavelength or a reception wavelength.

Fourth Embodiment

Figure 8:
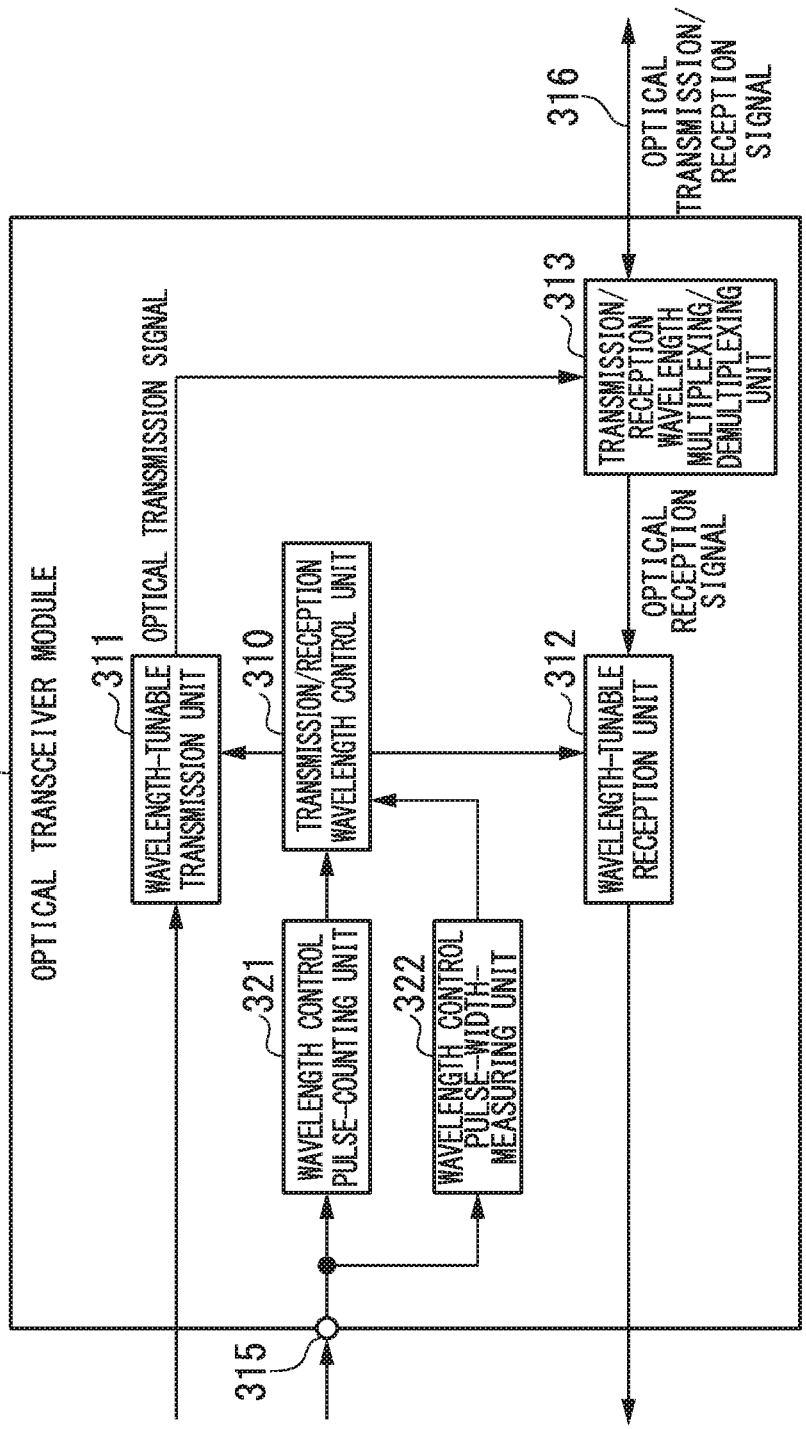
FIG. 8 is a block diagram illustrating the configuration of an optical transceiver module according to a fourth embodiment.

FIG. 8 is a block diagram illustrating the configuration of an optical transceiver module 301 according to a fourth embodiment. As illustrated in FIG. 8, the optical transceiver module 301 includes a transmission/reception wavelength control unit 310, a wavelength-tunable transmission unit 311, a wavelength-tunable reception unit 312, a transmission/reception wavelength multiplexing/demultiplexing unit 313, an input terminal 315, a wavelength control pulse-counting unit 321 and a wavelength control pulse-width-measuring unit 322. The wavelength-tunable transmission unit 311, the wavelength-tunable reception unit 312 and the transmission/reception wavelength multiplexing/demultiplexing unit 313 are respectively similar to the wavelength-tunable transmission unit 11, the wavelength-tunable reception unit 12 and the transmission/reception wavelength multiplexing/demultiplexing unit 13 illustrated in FIG. 1. In addition, an optical fiber 316 is similar to the optical fiber 16 illustrated in FIG. 1.

In the optical transceiver module 301 according to the fourth embodiment, a pulse signal is supplied to the input terminal 315 as a wavelength selection signal for transmission/reception, and the pulse signal has the number of pulses corresponding to a wavelength and has one of two pulse widths used for identifying one of a transmission wavelength and a reception wavelength as the setting target. FIG. 9 is a diagram illustrating a wavelength table storing a relationship between the number of pulses and a wavelength. As illustrated in the wavelength table illustrated in FIG. 9, the number of pulses "1" corresponds to a wavelength λ1, the number of pulses "2" corresponds to a wavelength λ2, the number of pulses "3" corresponds to a wavelength λ3, and the number of pulses "4" corresponds to a wavelength λ4. FIG. 10 is a diagram illustrating an identification table storing a relationship between a pulse width and transmission/reception. As illustrated in the identification table illustrated in FIG. 10, a pulse width τ1 corresponds to the transmission wavelength, and a pulse width τ2 corresponds to the reception wavelength. The wavelength control pulse-counting unit 321 counts the number of pulses of the wavelength selection signal supplied from the input terminal 315. The wavelength control pulse-width-measuring unit 322 measures a pulse width of the wavelength selection signal supplied from the input terminal 315. The optical transceiver module 301 may include the wavelength table illustrated in FIG. 9 and the identification table illustrated in FIG. 10. Alternatively, the transmission/ reception wavelength control unit 310 may include the wavelength table illustrated in FIG. 9 and the identification table illustrated in FIG. 10.

For example, in the case that the number of pulses of the wavelength selection signal supplied from the input terminal 315 is "1" and the pulse width is τ1, the transmission/reception wavelength control unit 310 sets the transmission wavelength of the wavelength-tunable transmission unit 311 as λ1 on the basis of the correspondence relationships represented in the tables illustrated in FIGS. 9 and 10. On the other hand, in the case that the number of pulses of the wavelength selection signal supplied from the input terminal 315 is "3," and the pulse width is τ2, the transmission/reception wavelength control unit 310 sets the reception wavelength of the wavelength-tunable reception unit 312 as λ3 on the basis of the correspondence relationships represented in the tables illustrated in FIGS. 9 and 10.

FIGS. 11A and 11B are waveform diagrams illustrating relationships between a wavelength selection signal and wavelength setting of transmission/reception in the optical transceiver module 301 according to the fourth embodiment. In FIGS. 11A and 11B, the horizontal axis represents the time, and the vertical axis represents the voltage of the wavelength selection signal input from the input terminal 315.

As illustrated in FIG. 11A, at a time t11, the pulses having the pulse width τ1 are assumed to be counted as the number of pulses "3" as the wavelength selection signal supplied from the input terminal 315. In this case, the wavelength control pulse-width-measuring unit 322 outputs the detected pulse width τ1 to the transmission/reception wavelength control unit 310. The wavelength control pulse-counting unit 321 outputs the number of pulses "3" to the transmission/reception wavelength control unit 310. Since the pulse width is τ1, the transmission/reception wavelength control unit 310 controls the transmission wavelength on the basis of the relationship represented in the identification table illustrated in FIG. 10. Since the number of pulses is "3," the transmission/reception wavelength control unit 310 selects the wavelength λ3 on the basis of the relationship represented in the wavelength table illustrated in FIG. 9. Accordingly, the transmission/reception wavelength control unit 310 sets the transmission wavelength of the wavelength-tunable transmission unit 311 as λ3.

In FIG. 11A, at a time t12, the pulses having a pulse width τ1 are assumed to be detected from the input terminal 315 of the wavelength selection signal as having the number of pulses of "1." In this case, since the pulse width is τ1, and the number of pulses is "1," the transmission/reception wavelength control unit 310 sets the transmission wavelength of the wavelength-tunable transmission unit 311 as λ1 on the basis of the relationships represented in the tables illustrated in FIGS. 9 and 10.

In FIG. 11B, at a time t13, a pulse having of a pulse width τ2 is assumed to be detected from the input terminal 315 of the wavelength selection signal as having the number of the pulse of "1." In this case, the transmission/reception wavelength control unit 310 sets the reception wavelength of the wavelength-tunable reception unit 312 as λ1 on the basis of the relationships represented in the tables illustrated in FIGS. 9 and 10.

In FIG. 11B, at a time t14, pulses having a pulse width τ2 are assumed to be detected from the input terminal 315 of the wavelength selection signal as having the number of pulses of "2." In this case, since the pulse width is τ2, and the number of pulses is "2," the transmission/reception wavelength control unit 310 sets the reception wavelength of the wavelength-tunable reception unit 312 as λ2 on the basis of the relationships represented in the tables illustrated in FIGS. 9 and 10.

As described above, in the optical transceiver module 301 according to the fourth embodiment, a pulse signal that has the number of pulses according to the wavelength and has a pulse width used for identifying a setting target is input to the input terminal 315 as a wavelength selection signal. Then, the number of pulses of the input pulse signal is counted by the wavelength control pulse-counting unit 321, and the pulse width of the pulse signal is detected by the wavelength control pulse-width-measuring unit 322. The input terminal 315 is a common terminal of wavelength control for the transmission wavelength and the reception wavelength. The optical transceiver module 301 can freely set the transmission wavelength and the reception wavelength at different wavelengths in accordance with a wavelength selection signal input to one pin included in the input terminal 315. The optical transceiver module 301 identifies one of the transmission wavelength and the reception wavelength as a setting target using a pulse width of the control pulse, and accordingly, as compared with the case that a setting target is identified using the number of pulses, a time that is necessary for inputting a wavelength selection signal can be shortened. In other words, the optical transceiver module 301 can shorten a time that is necessary for controlling a transmission wavelength or a reception wavelength.

Fifth Embodiment

Figures 12, 13:
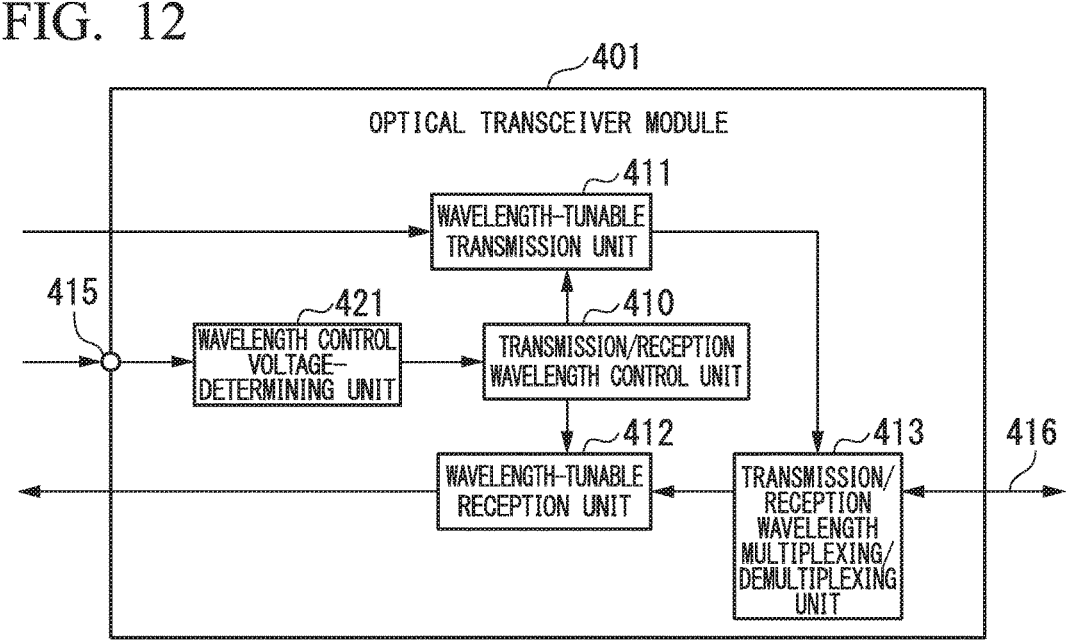
FIG. 12 is a block diagram illustrating the configuration of an optical transceiver module according to a fifth embodiment.
FIG. 13 is a diagram illustrating a relationship between a control voltage and a wavelength according to the fifth embodiment.

FIG. 12 is a block diagram illustrating the configuration of an optical transceiver module 401 according to a fifth embodiment. As illustrated in FIG. 12, the optical transceiver module 401 includes a transmission/reception wavelength control unit 410, a wavelength-tunable transmission unit 411, a wavelength-tunable reception unit 412, a transmission/reception wavelength multiplexing/demultiplexing unit 413, an input terminal 415 and a wavelength control voltage-determining unit 421. The wavelength-tunable transmission unit 411, the wavelength-tunable reception unit 412 and the transmission/reception wavelength multiplexing/demultiplexing unit 413 are respectively similar to the wavelength-tunable transmission unit 11, the wavelength-tunable reception unit 12 and the transmission/reception wavelength multiplexing/demultiplexing unit 13 illustrated in FIG. 1. In addition, an optical fiber 416 is similar to the optical fiber 16 illustrated in FIG. 1.

In the optical transceiver module 401 according to the fifth embodiment, a control voltage is supplied to the input terminal 415 as a wavelength selection signal of transmission/reception. This control voltage is divided into a setting range for a transmission wavelength and a setting range for a reception wavelength, and the control voltage and the wavelength are associated with each other. FIG. 13 is a diagram illustrating a wavelength table storing a relationship between a control voltage and a wavelength. In the wavelength table illustrated in FIG. 13, voltages E1 to E4 are used for setting the transmission wavelength. The control voltage E1 corresponds to a transmission wavelength λ1, the control voltage E2 corresponds to a transmission wavelength λ2, the control voltage E3 corresponds to a transmission wavelength λ3, and the control voltage E4 corresponds to a transmission wavelength λ4. Control voltages E5 to E8 are used for setting the reception wavelength. The control voltage E5 corresponds to a reception wavelength λ1, the control voltage E6 corresponds to a reception wavelength λ2, the control voltage E7 corresponds to a reception wavelength λ3, and the control voltage E8 corresponds to a reception wavelength λ4. In other words, the wavelength table in which voltage values of control voltages are respectively associated with a plurality of transmission wavelengths and a plurality of reception wavelengths is set in advance. Different voltage values are associated with transmission wavelengths and reception wavelengths such that the transmission wavelength and the reception wavelength can be uniquely selected. The optical transceiver module 401 may include the wavelength table illustrated in FIG. 13. Alternatively, the transmission/reception wavelength control unit 410 may include the wavelength table illustrated in FIG. 13.

When the wavelength selection signal is supplied to the input terminal 415, the control voltage of the wavelength selection signal is measured by the wavelength control voltage-determining unit 421. Then, the transmission wavelength or the reception wavelength is determined on the basis of a measured voltage value of the wavelength selection signal by the transmission/reception wavelength control unit 410.

For example, the measured voltage value of the wavelength selection signal supplied from the input terminal 415 that is measured by the wavelength control voltage-determining unit 421 is assumed as being E1. In this case, the control voltage is within the range of E1 to E4, and accordingly, the transmission/reception wavelength control unit 410 determines that the wavelength selection signal is setting for the transmission wavelength. Then, the transmission/reception wavelength control unit 410 sets the transmission wavelength of the wavelength-tunable transmission unit 411 as λ1 on the basis of the correspondence relationship represented in the wavelength table illustrated in FIG. 13.

In addition, the measured voltage value of the wavelength selection signal supplied from the input terminal 415 that is measured by the wavelength control voltage-determining unit 421 is assumed as being E5. In this case, the control voltage is within the range of E5 to E8, and accordingly, the transmission/reception wavelength control unit 410 determines that the wavelength selection signal is setting for the reception wavelength. Then, the transmission/reception wavelength control unit 410 sets the reception wavelength of the wavelength-tunable reception unit 412 as λ1 on the basis of the correspondence relationship represented in the wavelength table.

As described above, in the optical transceiver module 401 according to the fifth embodiment, a control voltage is supplied to the input terminal 415 as a wavelength selection signal of transmission and reception. Then, the control voltage is divided into the range of transmission wavelength control and the range of reception wavelength control, and the control voltage and a wavelength are associated with each other. The terminal 415 is a common terminal for wavelength control for the transmission wavelength and the reception wavelength. The optical transceiver module 401 can freely set the transmission wavelength and the reception wavelength as being different wavelengths in accordance with a wavelength selection signal input to one pin included in the input terminal 415. The measurement of a voltage executed by the wavelength control voltage-determining unit 421 can be executed in a relatively short time, and accordingly, the optical transceiver module 401 can improve the responsiveness for the wavelength selection signal.

Sixth Embodiment

Figure 14:
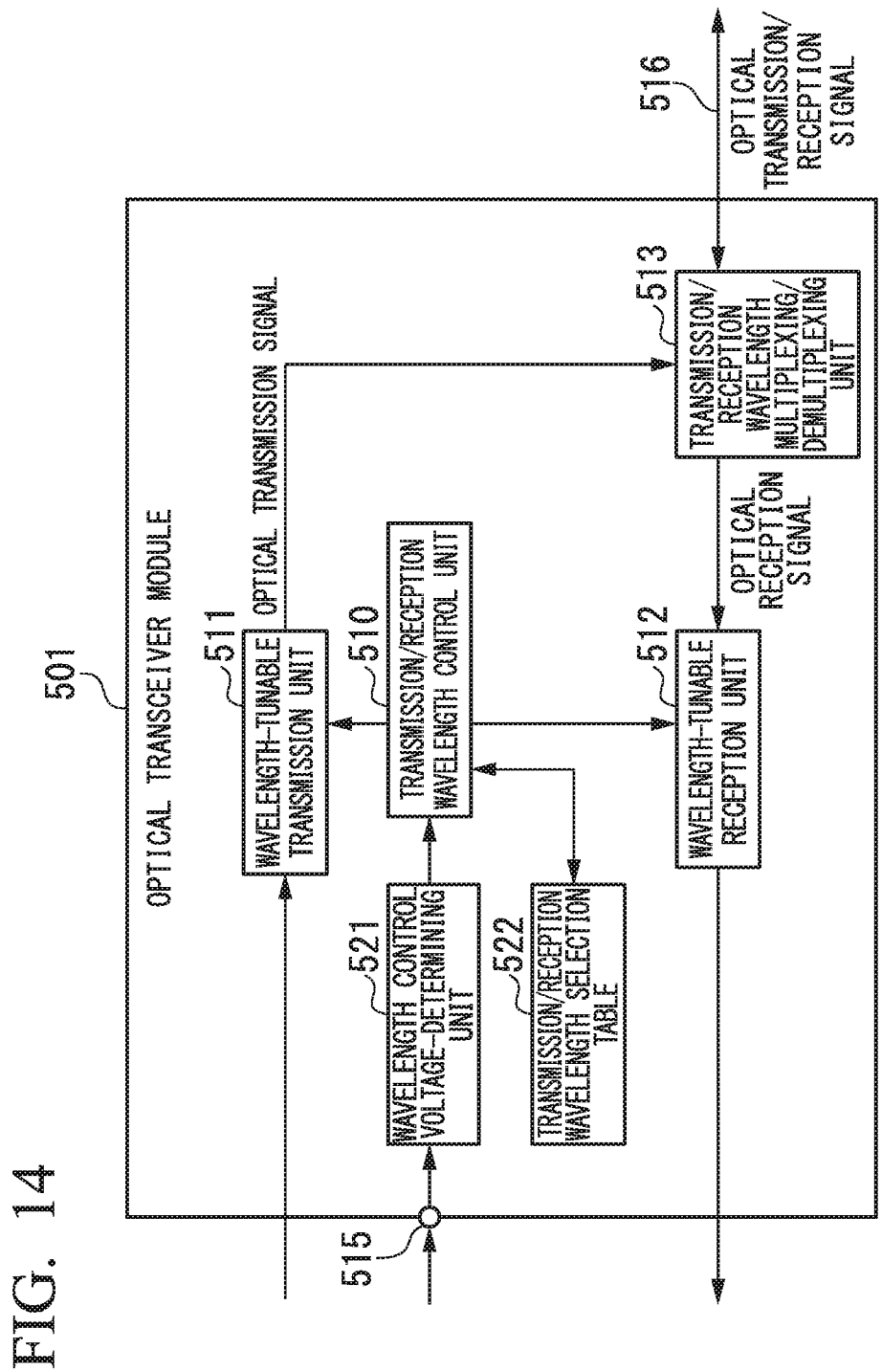
FIG. 14 is a block diagram illustrating the configuration of an optical transceiver module according to a sixth embodiment.

FIG. 14 is a block diagram illustrating the configuration of an optical transceiver module 501 according to a sixth embodiment. As illustrated in FIG. 14, the optical transceiver module 501 includes a transmission/reception wavelength control unit 510, a wavelength-tunable transmission unit 511, a wavelength-tunable reception unit 512, a transmission/reception wavelength multiplexing/demultiplexing unit 513, a wavelength control voltage-determining unit 521 and a transmission/reception wavelength selection table 522. The wavelength-tunable transmission unit 511, the wavelength-tunable reception unit 512 and the transmission/reception wavelength multiplexing/demultiplexing unit 513 are respectively similar to the wavelength-tunable transmission unit 11, the wavelength-tunable reception unit 12 and the transmission/reception wavelength multiplexing/demultiplexing unit 13 illustrated in FIG. 1. In addition, an optical fiber 516 is similar to the optical fiber 16 illustrated in FIG. 1. The transmission/reception wavelength selection table 522 may be included in the optical transceiver module 501 or may be connected to the outside.

FIGS. 15 and 16 are diagrams illustrating a relationship between a control voltage and a combination pattern of transmission and reception wavelengths. A control voltage is supplied to an input terminal 515 as a wavelength selection signal of transmission/reception, and the control voltage corresponds to a combination pattern of transmission and reception wavelengths as illustrated in FIGS. 15 and 16. As illustrated in FIG. 15, a control voltage of "0" to "T/16" (here, T is a maximum control voltage) corresponds to a pattern P1 having a transmission wavelength λ1 and a reception wavelength λ1. A control voltage of "T/16" to "2T/16" corresponds to a pattern P2 having a transmission wavelength λ2 and a reception wavelength λ1. A control voltage of "2T/16" to "3T/16" corresponds to a pattern P3 having a transmission wavelength λ3 and a reception wavelength λ1. A control voltage of "3T/16" to "4T/16" corresponds to a pattern P4 having a transmission wavelength λ4 and a reception wavelength λ1. Hereinafter, similarly, a relationship between a combination pattern of transmission and reception wavelengths and a control voltage is determined in advance. Then, as illustrated in FIG. 16, a relationship between the control voltage and the combination pattern of transmission and reception wavelengths is written in the transmission/reception wavelength selection table 522 in advance. In other words, a voltage value of a control voltage is associated with each of combination patterns of a transmission wavelength and a reception wavelength. Different voltage values are associated with the combination patterns such that a combination pattern can be uniquely selected.

When a wavelength selection signal is supplied to the input terminal 515, a voltage of the wavelength selection signal is detected by the wavelength control voltage-determining unit 521. Then, by referring to the transmission/reception wavelength selection table 522, in which the relationship as illustrated in FIG. 16 is stored, using the detected voltage, a combination pattern of transmission and reception wavelengths is determined.

For example, a voltage of the wavelength selection signal input to the input terminal 515 is assumed to be within the range of "0" to "T/16." In such a case, by referring to the transmission/reception wavelength selection table 522 illustrated in FIG. 16, the transmission/reception wavelength control unit 510 determines the pattern P1 having the transmission wavelength λ1 and the reception wavelength λ1. On the basis of the determination result, the transmission/reception wavelength control unit 510 sets the transmission wavelength of the wavelength-tunable transmission unit 511 as λ1 and sets the reception wavelength of the wavelength-tunable reception unit 512 as λ1.

In addition, a voltage of the wavelength selection signal input to the input terminal 515 is assumed to be within the range of "6T/16" to "7T/16." In this case, the transmission/reception wavelength control unit 510 determines the pattern P7 having the transmission wavelength λ3 and the reception wavelength λ2 by referring to the transmission/reception wavelength selection table 522 illustrated in FIG. 16. On the basis of the determination result, the transmission/reception wavelength control unit 510 sets the transmission wavelength of the wavelength-tunable transmission unit 311 as λ3 and sets the reception wavelength of the wavelength-tunable reception unit 512 as λ2.

In addition, in the example illustrated in FIG. 16, the combination patterns P1 to P16 of all the transmission and reception wavelengths are associated with times when predetermined control voltages are applied as the wavelength selection signal. On the other hand, a wavelength when the control voltage is "0" may be determined. A wavelength table illustrated in FIG. 17 is a diagram illustrating a modified example of the relationship between a control voltage and a combination pattern of transmission/reception wavelengths. In the example illustrated in FIG. 17, a wavelength pair when the control voltage is "0," in other words, when any wavelength selection signal is not applied is determined. In this way, if a wavelength when the control voltage is "0" is determined, it can be avoided that a wavelength pair is undetermined when any wavelength selection signal is not applied, and the set wavelengths can be easily reset.

As described above, in the optical transceiver module 501 according to the sixth embodiment, a control voltage corresponding to a combination pattern of transmission and reception wavelengths is supplied to the input terminal 515 as a wavelength selection signal. Then, a relationship between a control voltage and a combination pattern of transmission and reception wavelengths is stored in advance in the transmission/reception wavelength selection table 522. The optical transceiver module 501 can freely set the transmission wavelength and the reception wavelength as forming one of the combination patterns set in advance in accordance with a wavelength selection signal input to one pin included in the input terminal 515.

Seventh Embodiment

Figure 18:
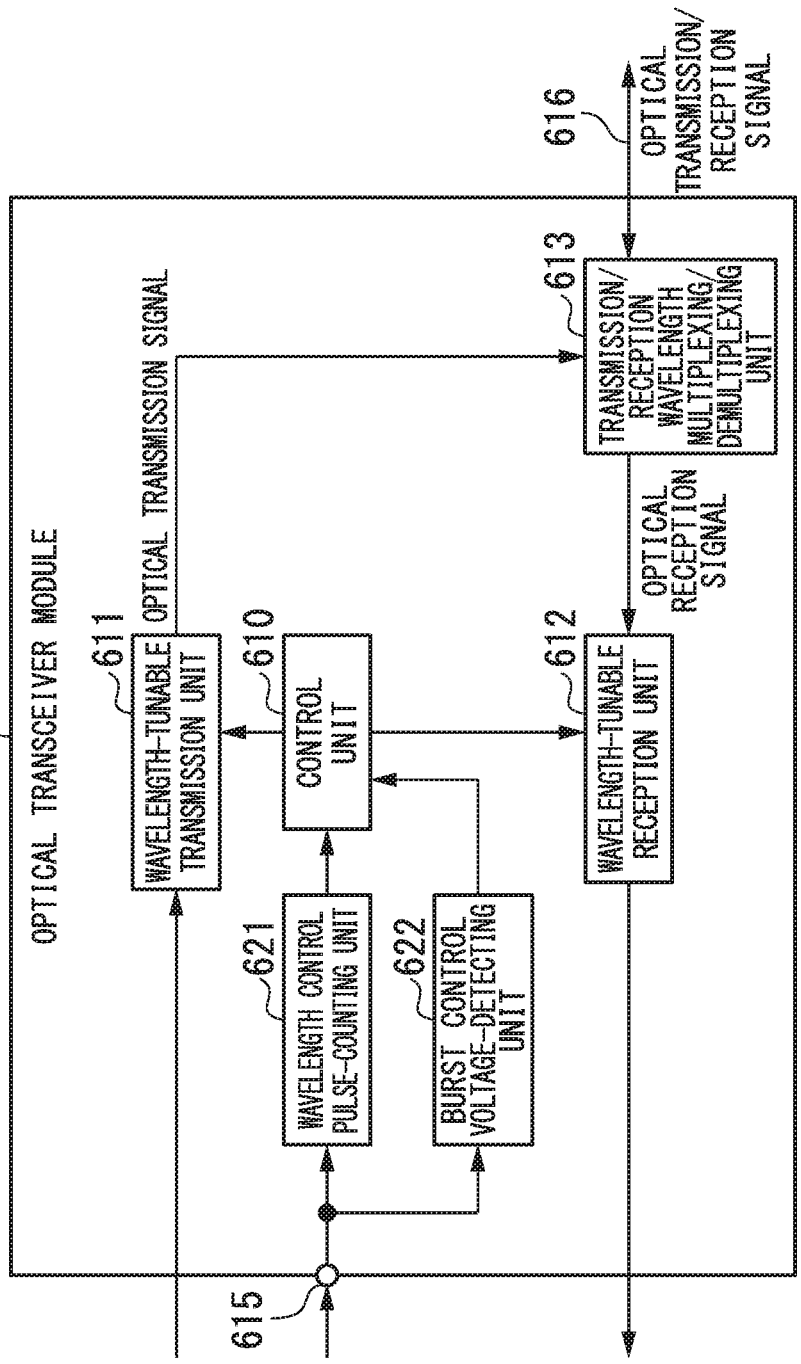
FIG. 18 is a block diagram illustrating the configuration of an optical transceiver module according to a seventh embodiment.

FIG. 18 is a block diagram illustrating the configuration of an optical transceiver module 601 according to a seventh embodiment. The optical transceiver module 601 includes a control unit 610, a wavelength-tunable transmission unit 611, a wavelength-tunable reception unit 612, a transmission/reception wavelength multiplexing/demultiplexing unit 613, an input terminal 615, a wavelength control pulse-counting unit 621 and a burst control voltage-detecting unit 622. In accordance with a signal input to the input terminal 615, the optical transceiver module 601 not only performs switching between wavelengths of an optical transmission signal or wavelengths of an optical reception signal but also performs switching between output and stoppage of an optical transmission signal. In the optical transceiver module 601, a wavelength selection signal and a transmission control signal are input to the input terminal 615. The wavelength selection signal directs switching between transmission wavelengths or reception wavelengths. The burst control signal as a transmission control signal switches between output and stop of an optical transmission signal.

The optical transceiver module 601 transmits/receives an optical signal to/from another device through an optical fiber 616 connected to the transmission/reception wavelength multiplexing/demultiplexing unit 613. The wavelength-tunable transmission unit 611, the wavelength-tunable reception unit 612 and the transmission/reception wavelength multiplexing/demultiplexing unit 613 perform the same operations as those of the wavelength-tunable transmission unit 11, the wavelength-tunable reception unit 12 and the transmission/reception wavelength multiplexing/demultiplexing unit 13 according to the first embodiment.

The input terminal 615 is a terminal that includes one pin. A signal input to the input terminal 615 is supplied to the wavelength control pulse-counting unit 621 and the burst control voltage-detecting unit 622.

The wavelength control pulse-counting unit 621 counts the number of control pulses of a signal input to the input terminal 615. The wavelength control pulse-counting unit 621 outputs a signal representing the number of counted pulses to the control unit 610. The wavelength control pulse-counting unit 621 has pulses having a pulse width and a voltage value, which are set in advance, as targets for counting. When a pulse having a pulse width and a voltage value, which are set in advance, is detected, the wavelength control pulse-counting unit 621 may start counting the number of pulses. In the case that a voltage value of a signal input to the input terminal 615 is constant over a period set in advance, the wavelength control pulse-counting unit 621 may determine that the input of pulses that are targets for counting has ended.

The burst control voltage-detecting unit 622 measures a voltage value of a signal input to the input terminal 615 and determines whether or not a burst control signal is input on the basis of the measurement result. As burst control signals, there are a burst-enable signal and a burst-disable signal.

FIG. 19 is a diagram illustrating a burst control signal according to the seventh embodiment. The burst-enable signal is a signal that directs output (on) of an optical transmission signal in the case that a control voltage value is at a high level and directs stoppage (off) of the optical transmission signal in the case that the control voltage value is at a low level. The burst-disable signal is a signal that directs stoppage (off) of an optical transmission signal in the case that a control voltage value is at the high level and directs output (on) of the optical transmission signal in the case that the control voltage value is at the low level. In the optical transceiver module 601, one of the burst-enable signal and the burst-disable signal that is set in advance is used as the burst control signal.

In the control voltage, voltage values at the high level and the low level are voltage values set in advance and may be voltage values that can be identified by the burst control voltage-detecting unit 622 as being at the high level and the low level. In the burst control signal, voltage values at the high level and the low level may be the same as or different from an upper limit value and a lower limit value of a voltage value used for a control pulse in a wavelength selection signal. By assigning a voltage higher than the upper limit value of the voltage of the control pulse to the high level of the burst control signal, the burst control voltage-detecting unit 622 can easily distinguish the burst control signal and the wavelength selection signal from each other.

The burst control voltage-detecting unit 622 determines whether or not the output of the optical transmission signal is directed on the basis of a result of measurement of a voltage value. In the case that the output of an optical transmission signal is determined as being directed, the burst control voltage-detecting unit 622 outputs a signal for directing the transmission of the optical transmission signal to the control unit 610. On the other hand, in the case that the output of an optical transmission signal is determined as not being directed, the burst control voltage-detecting unit 622 outputs a signal for directing the stoppage of the optical transmission signal to the control unit 610.

The burst control voltage-detecting unit 622 may determine whether or not the output of an optical transmission signal is directed after the wavelength control pulse-counting unit 621 determines that the input of pulses that are targets for counting has ended. By determining as such, in a period in which the control pulse is input, it can be prevented that the burst control voltage-detecting unit 622 outputs a signal to the control unit 610, and the control of the transmission of the optical transmission signal can be stabilized.

The control unit 610 sets a wavelength (transmission wavelength) of an optical transmission signal or a wavelength (reception wavelength) of an optical reception signal on the basis of a signal input from the wavelength control pulse-counting unit 621. The control unit 610, similar to the transmission/reception wavelength control unit 110 according to the second embodiment, includes a wavelength table (FIG. 3) representing correspondence between the number of pulses and the transmission and reception wavelengths. In addition, the wavelength table may be provided outside the control unit 610. The control unit 610 identifies one of the transmission wavelength and the reception wavelength that is a target for setting the wavelength on the basis of the number of pulses represented by a signal input from the wavelength control pulse-counting unit 621 and the wavelength table. The control unit 610 identifies the transmission wavelength as the setting target in the case that the transmission wavelength is associated with the number of pulses, and identifies the reception wavelength as the setting target in the case that the reception wavelength is associated with the number of pulses. The control unit 610 selects a wavelength corresponding to the number of pulses represented by the signal from the wavelength table.

In the case that the target for setting the wavelength is the transmission wavelength, the control unit 610 performs transmission wavelength control and causes the wavelength-tunable transmission unit 611 to transmit an optical transmission signal having the set transmission wavelength. In the transmission wavelength control, the control unit 610 sets the selected wavelength as the transmission wavelength in the wavelength-tunable transmission unit 611. In the case that the target for setting the wavelength is the reception wavelength, the control unit 610 performs reception wavelength control and causes the wavelength-tunable reception unit 612 to receive an optical reception signal having the set reception wavelength. In the reception wavelength control, the control unit 610 sets the selected wavelength as the reception wavelength in the wavelength-tunable reception unit 612.

The control unit 610 performs control of switching between output and stoppage of the optical transmission signal using the wavelength-tunable transmission unit 611 on the basis of a signal output from the burst control voltage-detecting unit 622. In the case that a signal directing the transmission of an optical transmission signal is output from the burst control voltage-detecting unit 622, the control unit 610 causes the wavelength-tunable transmission unit 611 to output the optical transmission signal. On the other hand, in the case that a signal directing the stoppage of an optical transmission signal is output from the burst control voltage-detecting unit 622, the control unit 610 causes the wavelength-tunable transmission unit 611 to stop the output of the optical transmission signal. Also in the case that a signal directing the transmission of an optical transmission signal is not output from the burst control voltage-detecting unit 622, the control unit 610 may cause the wavelength-tunable transmission unit 611 to stop the output of the optical transmission signal.

Figure 20:
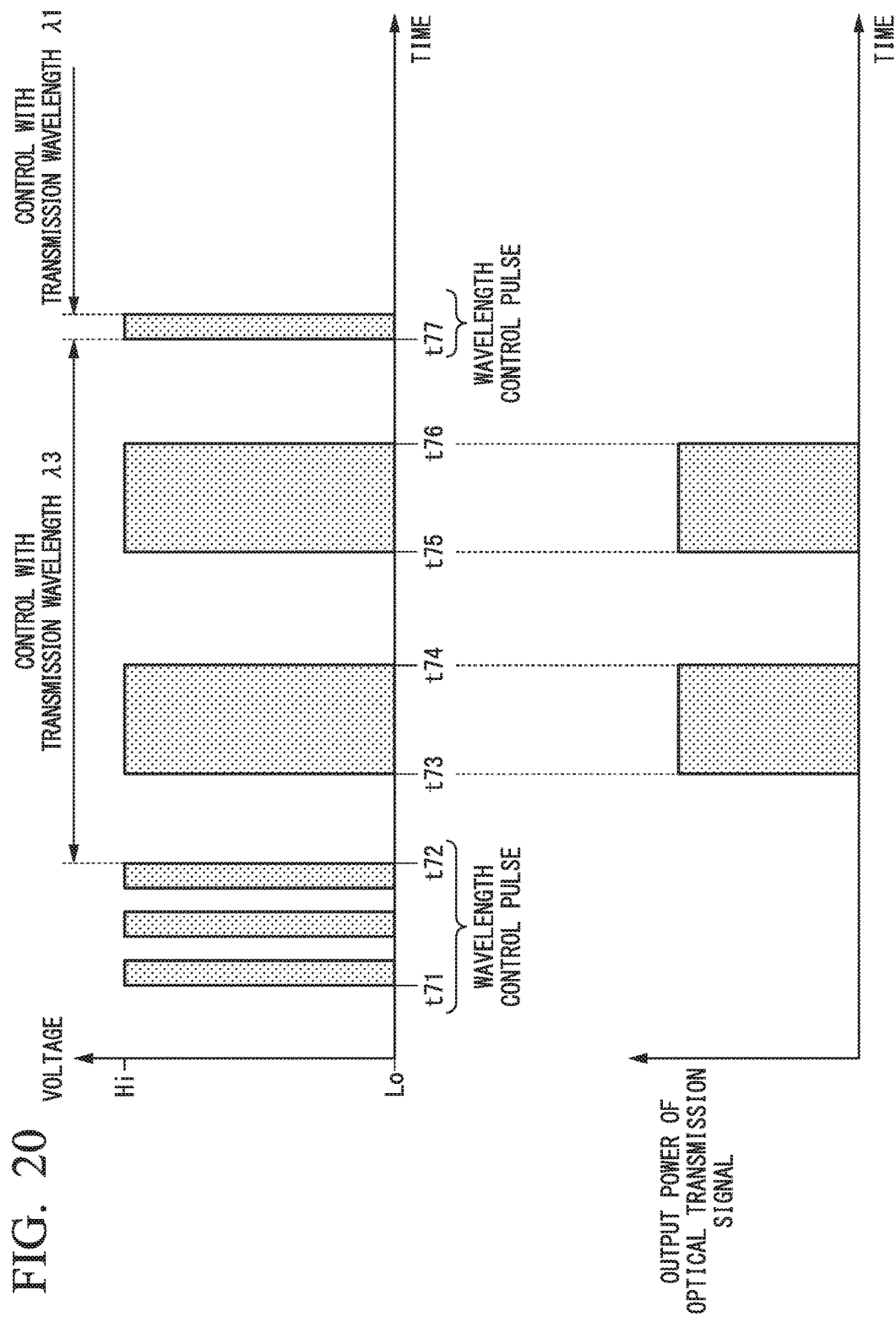
FIG. 20 is a waveform diagram illustrating one example of a relationship between a signal input to an input terminal and an optical transmission signal according to the seventh embodiment.

FIG. 20 is a waveform diagram illustrating one example of a relationship between a signal input to the input terminal 615 and an optical transmission signal according to the seventh embodiment. In FIG. 20, the vertical axis represents a voltage of a signal input to the input terminal 615 and output power of an optical transmission signal output from the optical transceiver module 601. The horizontal axis represents the time. The example illustrated in FIG. 20 is an example in which a burst-enable signal is used as the burst control signal.

In a period from a time t71 to a time t72, three control pulses are input to the input terminal 615. The wavelength control pulse-counting unit 621 counts the number of control pulses in a signal input to the input terminal 615 and outputs a signal representing the number of pulses (3) to the control unit 610. The control it 610 identifies that the transmission wavelength is the setting target on the basis of the number of pulses (3) represented by the signal and the wavelength table. The control unit 610 selects a wavelength λ3 corresponding to the number of pulses (3) from the wavelength table. The control unit 610 sets the wavelength λ3 in the wavelength-tunable transmission unit 611 as the transmission wavelength.

At a time t73 after the completion of input of the control pulse, a control voltage having the high level is input to the input terminal 615. The burst control voltage-detecting unit 622 determines that a voltage value of a signal input from the input terminal 615 as being at the high level and outputs a signal directing the transmission of an optical transmission signal to the control unit 610. The control unit 610 causes the wavelength-tunable transmission unit 611 to output an optical transmission signal having the transmission wavelength λ1 in accordance with a signal output from the burst control voltage-detecting unit 622.

At a time t74, a control voltage having the low level is input to the input terminal 615. The burst control voltage-detecting unit 622 determines a voltage value of the signal input from the input terminal 615 as being the low level and outputs a signal directing the stoppage of the optical transmission signal to the control unit 610. The control unit 610 causes the wavelength-tunable transmission unit 611 to stop the output of the optical transmission signal in accordance with a signal output from the burst control voltage-detecting unit 622.

Also at times t75 and t76, similar to the times t73 and t74, the burst control voltage-detecting unit 622, the control unit 610 and the wavelength-tunable transmission unit 611 operate.

At a time t77, one control pulse is input to the input terminal 615. The wavelength control pulse-counting unit 621 outputs a signal representing the number of counted pulses (1) to the control unit 610. The control unit 610 identifies that the transmission wavelength is the setting target on the basis of the number of pulses (1) represented by the signal and the wavelength table. The control unit 610 selects the wavelength λ1 corresponding to the number of pulses (1) from the wavelength table. The control unit 610 sets the wavelength λ1 in the wavelength-tunable transmission unit 611 as the transmission wavelength. Thereafter, the wavelength-tunable transmission unit 611 transmits the optical transmission signal having the set wavelength λ1.

Figure 21:
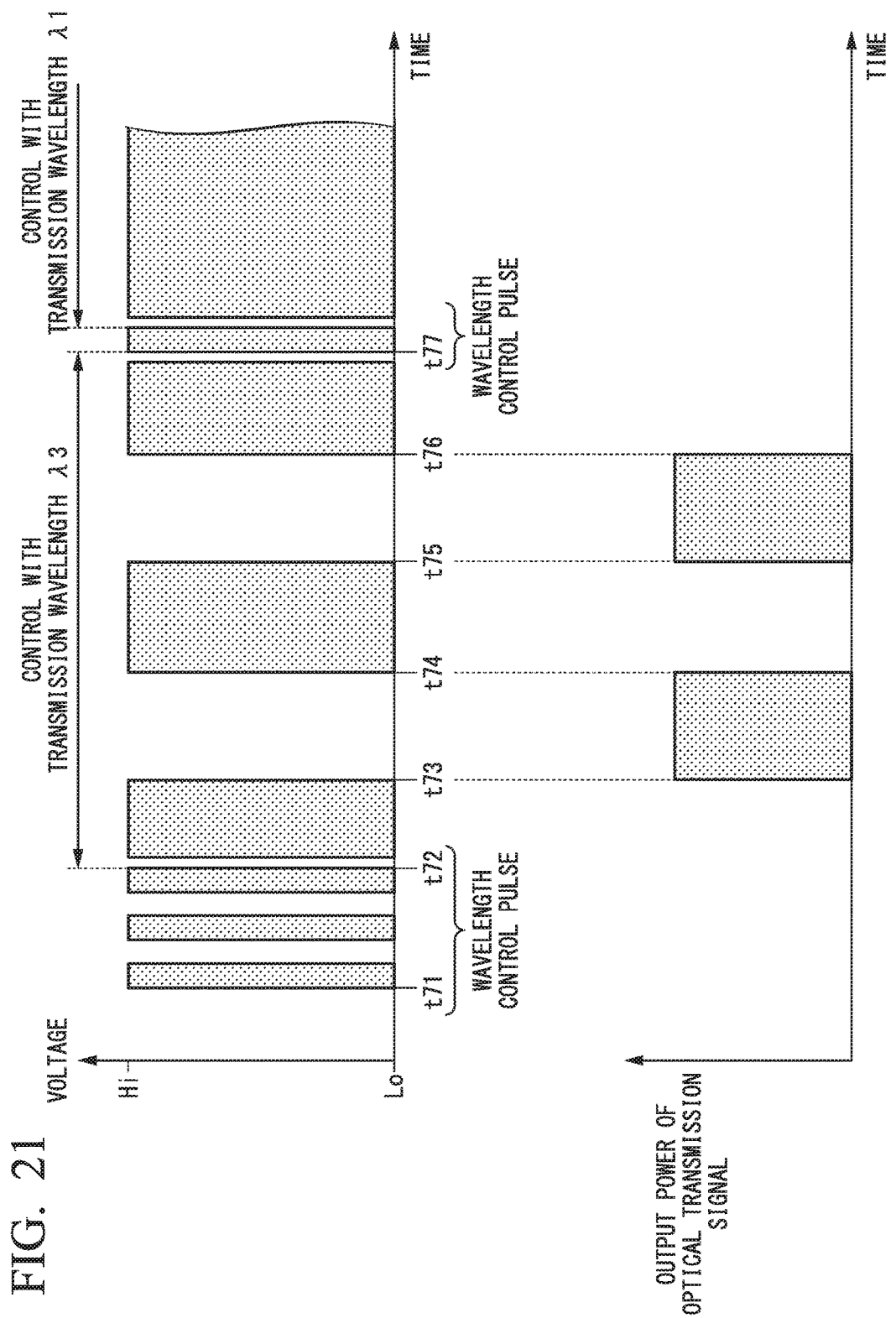
FIG. 21 is a waveform diagram illustrating another example of a relationship between a signal input to an input terminal and an optical transmission signal according to the seventh embodiment.

FIG. 21 is a waveform diagram illustrating one example of a relationship between a signal input to the input terminal 615 and an optical transmission signal according to the seventh embodiment. In FIG. 21, the vertical axis represents a voltage of a signal input to the input terminal 615 and output power of an optical transmission signal output from the optical transceiver module 601. The horizontal axis represents the time. The example illustrated in FIG. 21, unlike the example illustrated in FIG. 20, is an example, in which a burst-disable signal is used as the burst control signal. At a time t72 at which the setting of a wavelength pair using a wavelength control pulse is completed and subsequent times, a change in the voltage value of the signal input to the input terminal 615 has a waveform acquired by logically inverting the waveform illustrated in FIG. 20. In other words, in the example illustrated in FIG. 21, a signal input to the input terminal 615 is a signal acquired by logically inverting the signal of the case that the burst-enable signal is used as a burst control signal. In a period of a time t72 to a time t77, the operations of the burst control voltage-detecting unit 622, the control unit 610 and the wavelength-tunable transmission unit 611 are similar to those described with reference to FIG. 20.

According to the optical transceiver module 601, a wavelength selection signal and a burst control signal can be supplied to one pin included in the input terminal 615. The number of pins used for the selection of a transmission wavelength or a reception wavelength and the control of the transmission timing of the optical transmission signal is decreased, and a further decrease in size of the optical transceiver module 601 is achieved.

Figure 22:
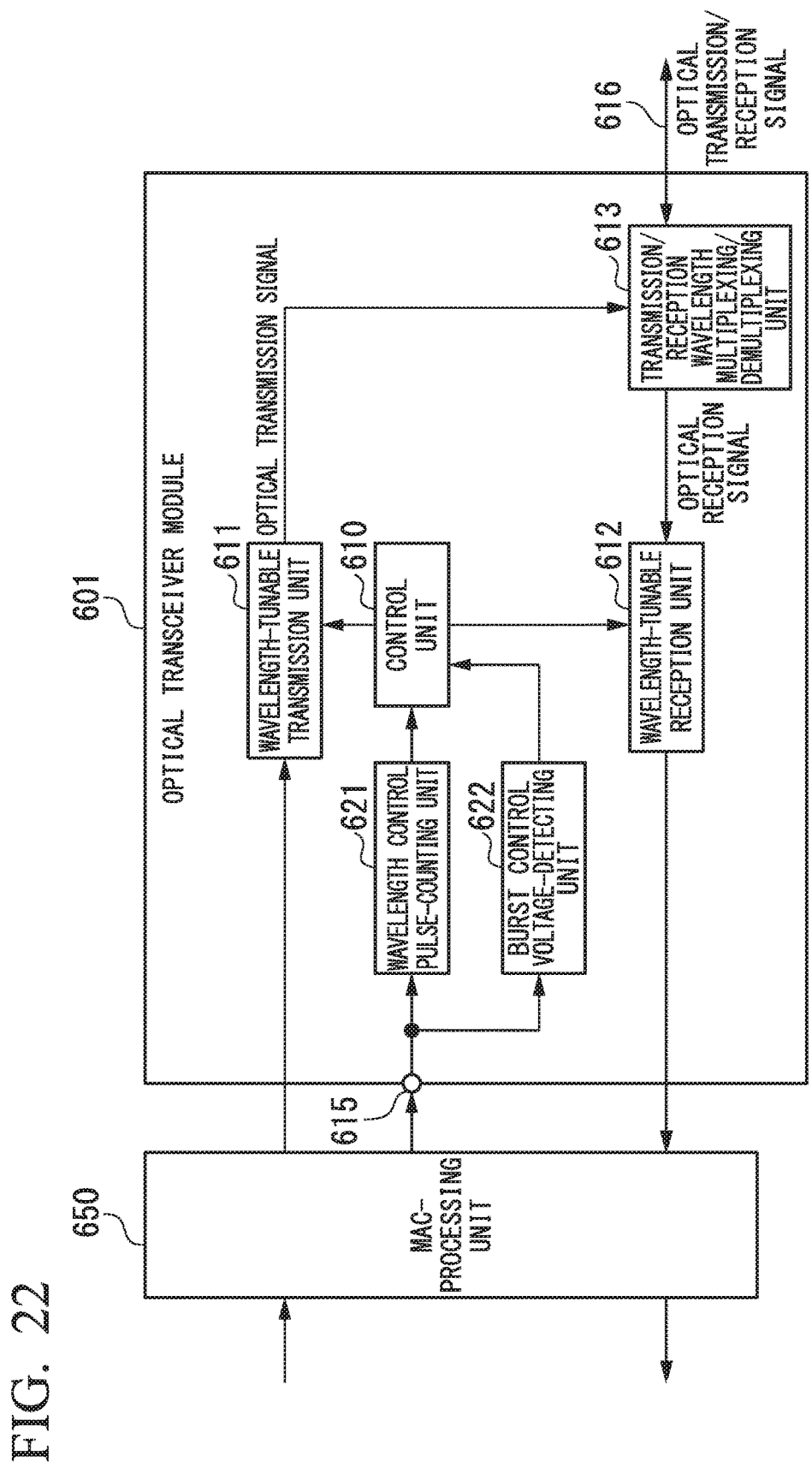
FIG. 22 is a block diagram illustrating a configuration example of a case that an optical transceiver module according to the seventh embodiment is applied to an optical transmission/reception device.

FIG. 22 is a block diagram illustrating a configuration example of the case that the optical transceiver module 601 according to the seventh embodiment is applied to an optical transmission/reception device. The optical transceiver module 601 is connected to a media access control (MAC)-processing unit 650. The MAC-processing unit 650 performs control of output of an optical transmission signal transmitted by the optical transceiver module 601 through an optical fiber 616, conversion between a frame configuration used for transmitting and receiving an optical signal and a data configuration used by an external device, error detection, error correction, and the like.

The MAC-processing unit 650 converts input data supplied from an external device to the frame configuration used for an optical transmission signal and supplies an electric signal acquired through the conversion to the wavelength-tunable transmission unit 611. The MAC-processing unit 650 acquires an electric signal output from the wavelength-tunable reception unit 612 and determines whether or not the electric signal is a signal addressed to its own device. In the case that the electric signal is a signal addressed to its own device, the MAC-processing unit 650 converts data included in the electric signal to the frame configuration used for an external device and supplies the electric signal acquired through the conversion to the external device. In the case that data directing a transmission wavelength or a reception wavelength for its own device is included in the electric signal, the MAC-processing unit 650 supplies a wavelength selection signal corresponding to the transmission wavelength or the reception wavelength directed by the data to the input terminal 615. In the case that data directing a timing at which an optical transmission signal is transmitted is included in the electric signal, the MAC-processing unit 650 supplies a burst control signal to the input terminal 615 at a time and a period directed in the data.

The optical transmission/reception device illustrated in FIG. 22 can set the transmission wavelength of the wavelength-tunable transmission unit 611 and the reception wavelength of the wavelength-tunable reception unit 612 on the basis of the transmission wavelength and the reception wavelength notified from a host apparatus through the optical fiber 616. The optical transmission/reception device can transmit the optical transmission signal in accordance with a transmission timing notified from the host apparatus. By using the optical transceiver module 601 and the MAC-processing unit 650 in combination, the optical transmission/reception device can transmit and receive an optical signal in accordance with the control of a host apparatus without additionally arranging an input pin for controlling transmission/reception.

In addition, the MAC-processing unit 650 illustrated in FIG. 22 may be connected to the optical transceiver modules 1, 101, 201, 301, 401 and 501 according to the first to sixth embodiments and used for an optical transmission/reception device. By combining the MAC-processing unit 650 and the optical transceiver module according to any one of the first to sixth embodiments with each other, an optical signal using a transmission wavelength and a reception wavelength directed from a host apparatus can be transmitted and received.

Each of the optical transceiver modules 201 and 301 according to the third or fourth embodiments may include the burst control voltage-detecting unit 622 described in the seventh embodiment. Alternatively, instead of the wavelength control pulse-counting unit 221, the wavelength control pulse voltage-measuring unit 222, the wavelength control pulse-counting unit 321 and the wavelength control pulse-width-measuring unit 322, the wavelength control pulse-counting unit 621 may identify one of the transmission wavelength and the reception wavelength as being a setting target on the basis of a voltage of the control pulse or a pulse width of the control pulse. Hereinafter, such modified examples will be described as eighth and ninth embodiments.

Eighth Embodiment

An optical transceiver module according to the eighth embodiment identifies one of a transmission wavelength and a reception wavelength as being a setting target using a voltage value of a control pulse input to an input terminal and controls transmission using a burst control signal input to the input terminal. The configuration of the optical transceiver module according to the eighth embodiment is similar to the configuration of the optical transceiver module 601 illustrated in FIG. 18, and parts of which operations are different will described.

The wavelength control pulse-counting 621 counts the number of pulses in a signal input to the input terminal 615. As the pulses that are counting targets of the wavelength control pulse-counting unit 621, there are a transmission wavelength control pulse representing the selection of the transmission wavelength and a reception wavelength control pulse representing the selection of the reception wavelength. Each of the transmission wavelength control pulse and the reception wavelength control pulse has a pulse width and a voltage value that are set in advance. A voltage of the transmission wavelength control pulse and a voltage value of the reception wavelength control pulse are different from each other. For example, as illustrated in the third embodiment as an example, the voltage value (V1) of the transmission wavelength control pulse is set as being higher than the voltage value (V2) of the reception wavelength control pulse. The voltage value of the reception wavelength control pulse may be set as being higher than the voltage value of the transmission wavelength control pulse. The voltage values of the transmission wavelength control pulse and the reception wavelength control pulse may be voltage values from which the wavelength control pulse-counting unit 621 can distinguish the transmission wavelength control pulse and the reception wavelength control pulse from each other.

The transmission wavelength control pulse and the reception wavelength control pulse are not input to the input terminal 615 in combination, and thus, when one of the transmission wavelength control pulse and the reception wavelength control pulse is detected, the wavelength control pulse-counting unit 621 counts the number of detected pulses. The wavelength control pulse-counting unit 621 outputs a signal representing the number of counted pulses and a voltage value of the counted pulses to the control unit 610.

The control unit 610, similar to the transmission/reception wavelength control unit 210 according to the third embodiment, includes the wavelength table (FIG. 5) representing a correspondence between the number of pulses and a wavelength and the identification table (FIG. 6) representing a correspondence between a pulse voltage and transmission/reception. In addition, the wavelength table and the identification table may be provided outside the control unit 610. The control unit 610 selects a wavelength corresponding to the number of pulses represented by a signal input from the wavelength control pulse-counting unit 621 from the wavelength table. The control unit 610 reads a target corresponding to the voltage value of the pulse represented by the signal input from the wavelength control pulse-counting unit 621 from the identification table, thereby identifying a setting target. In the case that the target read from the identification table is the transmission wavelength, the control unit 610 identifies the transmission wavelength as the setting target and performs transmission wavelength control. On the other hand, in the case that the target read from the identification table is the reception wavelength, the control unit 610 identifies the reception transmission wavelength as the setting target and performs reception wavelength control. In addition, the control unit 610 may compare a voltage value of the pulse represented by a signal input from the wavelength control pulse-counting unit 621 with voltage values V1 and V2 and identify the setting target on the basis of a result of the comparison.

According to the optical transceiver module of the eighth embodiment, a wavelength selection signal and a burst control signal can be supplied to one pin included in the input terminal. By using a voltage value of the control pulse input to the input terminal as a wavelength selection signal, one of the transmission wavelength and the reception wavelength as a setting target can be identified, and accordingly, a time that is necessary for the input of a control pulse can be shortened.

Ninth Embodiment

An optical transceiver module according to the ninth embodiment identifies one of the transmission wavelength and the reception wavelength as a setting target using a pulse width of a control pulse input to the input terminal, and transmission is controlled using a burst control signal input to the input terminal. The configuration of the optical transceiver module according to the ninth embodiment is similar to the configuration of the optical transceiver module 601 illustrated in FIG. 18, and parts of which operations are different will described.

The wavelength control pulse-counting unit 621 counts the number of pulses in a signal input to the input terminal 615. As the pulses that are counting targets of the wavelength control pulse-counting unit 621, similar to that of the eighth embodiment, there are a transmission wavelength control pulse representing the selection of the transmission wavelength and a reception wavelength control pulse representing the selection of the reception wavelength. In the ninth embodiment, a pulse width of the transmission wavelength control pulse and a pulse width of the reception wavelength control pulse are different from each other. For example, as illustrated in the fourth embodiment as an example, the pulse width ($\tau 1$) of the transmission wavelength control pulse is set as being narrower than the pulse width ($\tau 2$) of the reception wavelength control pulse. Here, the pulse width ($\tau 2$) of the reception wavelength control pulse may be set as being narrower than the pulse width ($\tau 1$) of the transmission wavelength control pulse. The pulse widths of the transmission wavelength control pulse and the reception wavelength control pulse may be pulse widths from which the wavelength control pulse-counting unit 621 can distinguish the transmission wavelength control pulse and the reception wavelength control pulse from each other.

The transmission wavelength control pulse and the reception wavelength control pulse are not input to the input terminal 615 in combination, and thus, when one of the transmission wavelength control pulse and the reception wavelength control pulse is detected, the wavelength control pulse-counting unit 621 counts the number of detected pulses. The wavelength control pulse-counting unit 621 outputs a signal representing the number of counted pulses and a pulse width of the counted pulses to the control unit 610.

The control unit 610, similar to the transmission/reception wavelength control unit 310 according to the fourth embodiment, includes the wavelength table (FIG. 9) representing a correspondence between the number of pulses and a wavelength and the identification table (FIG. 10) representing a correspondence between a pulse width and transmission/reception. In addition, the wavelength table and the identification table may be provided outside the control unit 610. The control unit 610 selects a wavelength corresponding to the number of pulses represented by a signal input from the wavelength control pulse-counting unit 621 from the wavelength table. The control unit 610 reads a target corresponding to the pulse width represented by the signal input from the wavelength control pulse-counting unit 621 from the identification table, thereby identifying a setting target. In the case that the target read from the identification table is the transmission wavelength, the control unit 610 identifies the transmission wavelength as the setting target and performs transmission wavelength control. On the other hand, in the case that the target read from the identification table is the reception wavelength, the control unit 610 identifies the reception transmission wavelength as the setting target and performs reception wavelength control. In addition, the control unit 610 may compare a pulse width represented by a signal input from the wavelength control pulse-counting unit 621 with pulse widths $\tau 1$ and $\tau 2$ and identify the setting target on the basis of a result of the comparison.

According to the optical transceiver module of the ninth embodiment, a wavelength selection signal and a burst control signal can be supplied to one pin included in the input terminal. By using a pulse width of the control pulse input to the input terminal as a wavelength selection signal, one of the transmission wavelength and the reception wavelength can be identified as a setting target, and accordingly, a time that is necessary for the input of a control pulse can be shortened.

The wavelength-tunable transmission units 11, 111, 211, 311, 411, 511 and 611 according to the first to ninth embodiments may convert an electric signal into an optical transmission signal by driving a laser diode (LD) using an electric signal supplied from the outside of the optical transceiver modules 1, 101, 201, 301, 401, 501 and 601. Alternatively, the wavelength-tunable transmission units 11, 111, 211, 311, 411, 511 and 611 may convert an electric signal into an optical transmission signal by performing modulation of changing at least one of a phase, an amplitude, and a plane of polarization of locally-generated light generated from an LD using an electric signal supplied from the outside. In both the case that the LD is used and the case that modulation is performed, the wavelength-tunable transmission units 11, 111, 211, 311, 411, 511 and 611 output an optical transmission signal having a wavelength set in the transmission wavelength.

The wavelength-tunable reception units 12, 112, 212, 312, 412, 512 and 612 according to the first to ninth embodiments may convert an optical reception signal having a wavelength set in the reception wavelength among optical reception signals of respective wavelengths supplied through the transmission/reception wavelength multiplexing/demultiplexing units 13, 113, 213, 313, 413, 513 and 613 into an electric signal. For demultiplexing, for example, a diffraction grating, a wavelength filter, or the like is used. Alternatively, the wavelength-tunable reception units 12, 112, 212, 312, 412, 512 and 612 may convert a supplied optical reception signal into an electric signal and extract a signal corresponding to the wavelength set in the reception wavelength from the electric signal. The wavelength-tunable reception units 12, 112, 212, 312, 412, 512 and 612 output the acquired electric signal to the outside of the optical transceiver modules 1, 101, 201, 301, 401, 501 and 601.

As the transmission/reception wavelength multiplexing/demultiplexing units 13, 113, 213, 313, 413, 513 and 613 according to the first to ninth embodiments, for example, optical couplers, optical splitters, or the like are used. The optical transceiver modules 1, 101, 201, 301, 401, 501 and 601 may not respectively include the transmission/reception wavelength multiplexing/demultiplexing units 13, 113, 213, 313, 413, 513 and 613. In the case that the optical transceiver modules 1, 101, 201, 301, 401, 501 and 601 do not respectively include the transmission/reception wavelength multiplexing/demultiplexing units 13, 113, 213, 313, 413, 513 and 613, input ports to which optical reception signals are respectively input from the optical fibers 16, 116, 216, 316, 416, 516 and 616 and output ports respectively outputting optical transmission signals to the optical fibers 16, 116, 216, 316, 416, 516 and 616 may be respectively included in the optical transceiver modules 1, 101, 201, 301, 401, 501 and 601. The optical reception signals input to the input ports are respectively supplied to the wavelength-tunable reception units 12, 112, 212, 312, 412, 512 and 612. The optical transmission signals respectively output from the wavelength-tunable transmission units 11, 111, 211, 311, 411, 511 and 611 are respectively supplied to the output ports.

The optical transceiver modules 101, 201, 301 and 401 described in the second to fifth embodiments as optical transceivers respectively include: the wavelength-tunable transmission units 111, 211, 311 and 411 transmitting optical transmission signals; the wavelength-tunable reception units 112, 212, 312 and 412 receiving optical reception signals; wavelength tables each storing a plurality of wavelengths; the input terminals 115, 215, 315 and 415 to which wavelength selection signals are respectively input; and transmission/reception wavelength control units 110, 210, 310 and 410 (hereinafter, referred to as control units) controlling the wavelength-tunable transmission units 111, 211, 311 and 411 and the wavelength-tunable reception units 112, 212, 312 and 412. Each of the optical transceiver modules 601 as the optical transceivers described in the seventh to ninth embodiments and the optical transceiver modules of the modified examples thereof includes: the wavelength-tunable transmission unit 611 transmitting an optical transmission signal; the wavelength-tunable reception unit 612 receiving an optical reception signal; the wavelength table storing a plurality of wavelengths; the input terminal 615 to which a wavelength selection signal is input; and the control unit 610 controlling the wavelength-tunable transmission unit 611 and the wavelength-tunable reception unit 612. Each of the control units 110, 210, 310, 410 and 610 identifies one of the optical transmission signal and the optical reception signal as being a target on the basis of the wavelength selection signal and selects a wavelength from the wavelength table on the basis of the wavelength selection signal. In the case that the optical transmission signal is identified as a target, the control units 110, 210, 310, 410 and 610 perform transmission wavelength control in which the selected wavelength is set in the wavelength-tunable transmission units 111, 211, 311, 411 and 611 as the wavelength of the optical transmission signal. On the other hand, in the case that the optical reception signal is identified as a target, the control units 110, 210, 310, 410 and 610 perform reception wavelength control in which the selected wavelength is set in the wavelength-tunable reception units 112, 212, 312, 412 and 612 as the wavelength of the optical reception signal. According to the optical transceiver modules 101, 201, 301, 401 and 601 and the optical transceiver modules of the modified examples thereof configured in this way, the transmission wavelength or the reception wavelength can be selected using one input terminal 115, 215, 315, 415 and 615, and the number of terminals used for controlling optical signals that are transmitted and received can be reduced.

INDUSTRIAL APPLICABILITY

The present invention can be applied to a use for which it is necessary to decrease the number of terminals used for controlling optical signals to be transmitted and received.

REFERENCE SIGNS LIST 1, 101, 201, 301, 401, 501, 601 Optical transceiver module
10, 110, 210, 310, 410, 510 Transmission/reception wavelength control unit
11, 111, 211, 311, 411, 511, 611 Wavelength-tunable transmission unit
12, 112, 212, 312, 412, 512, 612 Wavelength-tunable reception unit
15, 115, 215, 315, 415, 515, 615 Input terminal
121, 221, 321, 621 Wavelength control pulse-counting unit
222 Wavelength control pulse voltage-measuring unit
322 Wavelength control pulse-width-measuring unit
421, 521 Wavelength control voltage-determining unit
522 Transmission/reception wavelength selection table
610 Control unit
622 Burst control voltage-detecting unit
650 MAC-processing unit

The invention claimed is:

1. An optical transceiver comprising:
a wavelength-tunable transmitter configured to transmit an optical transmission signal;
a wavelength-tunable receiver configured to receive an optical reception signal;
a wavelength table configured to store a plurality of wavelengths;
an input terminal configured to input a wavelength selection signal; and
a controller configured to receive the wavelength selection signal from the input terminal, identify one of the optical transmission signal or the optical reception signal as a target on a basis of the wavelength selection signal, select a wavelength from the wavelength table on a basis of the wavelength selection signal, perform transmission wavelength control in which the selected wavelength is set in the wavelength-tunable transmitter as a wavelength of the optical transmission signal in a case that the optical transmission signal is identified as the target, and perform reception wavelength control in which the selected wavelength is set in the wavelength-tunable receiver as a wavelength of the optical reception signal in a case that the optical reception signal is identified as the target;
wherein the wavelength selection signal is input to the input terminal as one or more control pulses,
wherein the wavelength table stores the number of control pulses in association with each of wavelengths of the optical transmission signal and each of wavelengths of the optical reception signal, and
wherein the controller selects a wavelength of the optical transmission signal or a wavelength of the optical reception signal corresponding to the number of the one or more control pulses as the wavelength selection signal, performs the transmission wavelength control in a case that the wavelength of the optical transmission signal is selected, and performs the reception wavelength control in a case that the wavelength of the optical reception signal is selected.

2. An optical transceiver comprising:
a wavelength-tunable transmitter configured to transmit an optical transmission signal;
a wavelength-tunable receiver configured to receive an optical reception signal;
a wavelength table configured to store a plurality of wavelengths;
an input terminal configured to input a wavelength selection signal; and
a controller configured to receive the wavelength selection signal from the input terminal, identify one of the optical transmission signal or the optical reception signal as a target on a basis of the wavelength selection signal, select a wavelength from the wavelength table on a basis of the wavelength selection signal, perform transmission wavelength control in which the selected wavelength is set in the wavelength-tunable transmitter as a wavelength of the optical transmission signal in a case that the optical transmission signal is identified as the target, and perform reception wavelength control in which the selected wavelength is set in the wavelength-tunable receiver as a wavelength of the optical reception signal in a case that the optical reception signal is identified as the target;
wherein the wavelength selection signal is input to the input terminal as one or more control pulses,
wherein the wavelength table stores the number of control pulses in association with each of the plurality of wavelengths, and
wherein the controller identifies one of the optical transmission signal and the optical reception signal as a target on a basis of a voltage value or a pulse width of the one or more control pulses as the wavelength selection signal, selects a wavelength corresponding to the number of the one or more control pulses as the wavelength selection signal from the wavelength table, performs the transmission wavelength control in a case that the optical transmission signal is identified as the target, and performs the reception wavelength control in a case that the optical reception signal is identified as the target.

3. An optical transceiver comprising:
a wavelength-tunable transmitter configured to transmit an optical transmission signal;
a wavelength-tunable receiver configured to receive an optical reception signal;
a wavelength table configured to store a plurality of wavelengths;
an input terminal configured to input a wavelength selection signal; and
a controller configured to receive the wavelength selection signal from the input terminal, identify one of the optical transmission signal or the optical reception signal as a target on a basis of the wavelength selection signal, select a wavelength from the wavelength table on a basis of the wavelength selection signal, perform transmission wavelength control in which the selected wavelength is set in the wavelength-tunable transmitter as a wavelength of the optical transmission signal in a case that the optical transmission signal is identified as the target, and perform reception wavelength control in which the selected wavelength is set in the wavelength-tunable receiver as a wavelength of the optical reception signal in a case that the optical reception signal is identified as the target;
wherein the wavelength selection signal is input to the input terminal as a control voltage having one voltage value among a plurality of voltage values set in advance,
wherein the wavelength table stores a voltage value of the control voltage in association with each of wavelengths of the optical transmission signal and each of wavelengths of the optical reception signal, and
wherein the controller selects a wavelength of the optical transmission signal or a wavelength of the optical reception signal corresponding to the voltage value of the control voltage as the wavelength selection signal, performs the transmission wavelength control in a case that the wavelength of the optical transmission signal is selected, and performs the reception wavelength control in a case that the wavelength of the optical reception signal is selected.

4. The optical transceiver according to claim 1,
wherein a transmission control signal set by voltage value corresponding to transmission or stoppage of the optical transmission signal is input to the input terminal, and
wherein the controller controls transmission of the optical transmission signal by the wavelength-tunable transmitter in accordance with the transmission control signal.

5. A control method in an optical transceiver including a wavelength-tunable transmitter transmitting an optical transmission signal, a wavelength-tunable receiver receiving an optical reception signal, a wavelength table storing a plurality of wavelengths, and an input terminal to which a wavelength selection signal is input, the control method comprising:
- a step of identifying one of the optical transmission signal or the optical reception signal as a target on a basis of the wavelength selection signal, where the wavelength selection signal is input to the input terminal as one or more control pulses;
- a step of selecting a wavelength from the wavelength table on a basis of the wavelength selection signal, where the wavelength table stores the number of control pulses in association with each of the plurality of wavelengths and the selected wavelength corresponding to the number of the one or more control pulses; and
- a step of performing transmission wavelength control in which the selected wavelength is set in the wavelength-tunable transmitter as a wavelength of the optical transmission signal in a case that the optical transmission signal is identified as the target and performing reception wavelength control in which the selected wavelength is set in the wavelength-tunable receiver as a wavelength of the optical reception signal in a case that the optical reception signal is identified as the target.

6. A control method in an optical transceiver including a wavelength-tunable transmitter transmitting an optical transmission signal, a wavelength-tunable receiver receiving an optical reception signal, a wavelength table storing a plurality of wavelengths, and an input terminal to which a wavelength selection signal is input, the control method comprising:
- a step of identifying one of the optical transmission signal or the optical reception signal as a target on a basis of a voltage value or a pulse width of one or more control pulses, where the wavelength selection signal is input to the input terminal as one or more control pulses;
- a step of selecting a wavelength corresponding to the number of the one or more control pulses for the wavelength selection signal from the wavelength table, where the wavelength table stores the number of control pulses in association with each of the plurality of wavelengths; and
- a step of performing transmission wavelength control in which the selected wavelength is set in the wavelength-tunable transmitter as a wavelength of the optical transmission signal in a case that the optical transmission signal is identified as the target and performing reception wavelength control in which the selected wavelength is set in the wavelength-tunable receiver as a wavelength of the optical reception signal in a case that the optical reception signal is identified as the target.

7. A control method in an optical transceiver including a wavelength-tunable transmitter transmitting an optical transmission signal, a wavelength-tunable receiver receiving an optical reception signal, a wavelength table storing a plurality of wavelengths, and an input terminal to which a wavelength selection signal is input, the control method comprising:
- a step of identifying one of the optical transmission signal or the optical reception signal as a target on a basis of the wavelength selection signal, where the wavelength selection signal is input to the input terminal as a control voltage having one voltage value among a plurality of voltage values set in advance;
- a step of selecting a wavelength of the optical transmission signal or a wavelength of the optical reception signal corresponding to a voltage value of a control voltage for the wavelength selection signal, where the wavelength table stores a voltage value of the control voltage in association with each of the wavelengths of the optical transmission signal and each of wavelengths of the optical reception signal; and
- a step of performing transmission wavelength control in which the selected wavelength is set in the wavelength-tunable transmitter as a wavelength of the optical transmission signal in a case that the optical transmission signal is identified as the target and performing reception wavelength control in which the selected wavelength is set in the wavelength-tunable receiver as a wavelength of the optical reception signal in a case that the optical reception signal is identified as the target.

* * * * *